(12) United States Patent
Chen et al.

(10) Patent No.: US 12,475,356 B2
(45) Date of Patent: Nov. 18, 2025

(54) NEURAL NETWORK PROCESSING METHOD, COMPUTER SYSTEM AND STORAGE MEDIUM

(71) Applicant: Cambricon Technologies Corporation Limited, Beijing (CN)

(72) Inventors: Xunyu Chen, Beijing (CN); Qi Guo, Beijing (CN); Jie Wei, Beijing (CN); Linyang Wu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 864 days.

(21) Appl. No.: 16/612,361

(22) PCT Filed: Dec. 17, 2018

(86) PCT No.: PCT/CN2018/121399
§ 371 (c)(1),
(2) Date: May 7, 2020

(87) PCT Pub. No.: WO2019/128752
PCT Pub. Date: Jul. 4, 2019

(65) Prior Publication Data
US 2023/0196069 A1    Jun. 22, 2023

(30) Foreign Application Priority Data

Dec. 29, 2017   (CN) .......................... 201711483733.5
Dec. 29, 2017   (CN) .......................... 201711487624.0

(51) Int. Cl.
*G06N 3/045*       (2023.01)
(52) U.S. Cl.
CPC .................................... *G06N 3/045* (2023.01)
(58) Field of Classification Search
CPC ...................................................... G06N 3/045
See application file for complete search history.

(56) References Cited

U.S. PATENT DOCUMENTS

2016/0358099 A1 * 12/2016 Sturlaugson ........... G06N 5/043
2017/0337468 A1    11/2017 Bruestle et al.

FOREIGN PATENT DOCUMENTS

CN        102122132 A      7/2011
CN        106650922 A      5/2017
(Continued)

OTHER PUBLICATIONS

Guan, Y., et al., FP-DNN: An Automated Framework for Mapping Deep Neural Networks onto FPGAs with RTL-HLS Hybrid Templates, [received May 24, 2023]. Retrieved from Internet:<https://ieeexplore.ieee.org/abstract/document/7966671/> (Year: 2017).*

(Continued)

*Primary Examiner* — Miranda M Huang
*Assistant Examiner* — Bart I Rylander
(74) *Attorney, Agent, or Firm* — Getech Law LLC; Jun Ye

(57) ABSTRACT

A neural network processing method, comprising the following steps: obtaining a model dataset and model structure parameters of an original network (S100); obtaining an operational attribute of each compute node in the original network; operating the original network according to the model dataset and the model structure parameters of the original network and the operational attribute of each compute node, to obtain an instruction corresponding to each compute node in the original network (S200); and if the operational attribute of the current compute node is a first operational attribute, storing a network weight and the instruction corresponding to the current compute node into a first non-volatile memory, so as to obtain a first offline model corresponding to the original network (S300). Further provided are a computer system and a storage medium. The neural network processing method, the computer system, and the storage medium shorten the time for a processor to (Continued)

operate the same network, and improve the processing speed and efficiency of the processor.

18 Claims, 6 Drawing Sheets

(56) References Cited

FOREIGN PATENT DOCUMENTS

| CN | 106815644 | A | 6/2017 |
|---|---|---|---|
| CN | 106845631 | A | 6/2017 |
| CN | 106953862 | A | 7/2017 |
| CN | 107103113 | A | 8/2017 |
| IN | 106408343 | A | 2/2017 |
| JP | 2001051968 | A | 2/2001 |
| JP | 2008310700 | A | 12/2008 |
| WO | 2005013019 | A2 | 2/2005 |
| WO | 2018171717 | A1 | 9/2018 |

OTHER PUBLICATIONS

Guo, K., et al., [DL] A Survey of FPGA Based Neural Network Accelerator, [received May 24, 2023]. Retrieved from Internet:<https://arxiv.org/abs/1712.08934> (Year: 2017).*
Ma, Y., et al., An Automatic RTL Compiler for High-Throughput FPGA Implementation of Diverse Deep Convolutional Neural Networks, [received on May 24, 2023]. Retrieved from Internet:<https://ieeexplore.ieee.org/abstract/document/8056824> (Year: 2017).*
Sharma, H., et al., From High-Level Deep Neural Models to FPGAs, [received on May 24, 2023]. Retrieved from Internet:<https://ieeexplore.ieee.org/abstract/document/7783720> (Year: 2016).*
Wang, Y., et al., DeepBurning: Automatic Generation of FPGA-based Learning Accelerators for the Neural Network Family, [received on May 24, 2023]. Retrieved from Internet:<https://dl.acm.org/doi/abs/10.1145/2897937.2898003> (Year: 2016).*
Sankaradas, M., et al., A Massively Parallel Coprocessor for Convolutional Neural Networks, [received Aug. 6, 2024]. Retrieved from Internet:<https://ieeexplore.ieee.org/abstract/document/5200010> (Year: 2009).*
Colangelo, P., et al., Application of Convolutional Neural Networks on Intel Xeon Processor with Integrated FPGA, [received Mar. 6, 2025]. Retrieved from Internet:<.ieee.org/abstract/document/8091025?casa_token=TxChglDu_rgAAAAA:OxM7LhRoB2kdMMLoXt7LbUvGkXzhr89tdPON7m-p5d0dgw9_pXtgOBq-jA0MM1zyrZqzsL (Year: 2017).*
EP 18894609.9—Communication pursuant to Article 94(3) EPC, mailed May 30, 2022, 10 pages.
Office Action received in Application No. 201711487624.0, mailed on Aug. 30, 2019, 10 pages.
International Search Report received in Application No. PCT/CN2018/121399, mailed Mar. 18, 2019, 10 pages.
CN202010364385.5—First Office Action mailed on Mar. 8, 2023, 14 pages. (With Brief English Explanation).
CN 201711487624.0—Second Office Action, mailed Nov. 20, 2019, 7 pages. (no English translation).
CN 201711487624.0—Third Office Action, mailed Feb. 26, 2020, 5 pages. (no English translation).
CN 201711483733.5—First Office Action, mailed Aug. 28, 2019, 5 pages. (no English translation).
EP 18894609.9—Extended European Search Report, mailed Oct. 22, 2020, 9 pages.
EP18894609.9- Communication pursuant to Article 94(3) EPC mailed on Jul. 13, 2023, 12 pages.
JP 2019570862- Decision to Grant a Patent mailed on Jun. 6, 2023, 7 pages.
JP 2019-570862—Office Action, mailed on Nov. 22, 2022, 7 pages.

* cited by examiner

NEURAL NETWORK PROCESSING METHOD, COMPUTER SYSTEM AND STORAGE MEDIUM

TECHNICAL FIELD

The present disclosure relates to the technical field of deep learning, and specifically to a neural network processing method, a computer system and a storage medium.

BACKGROUND

Deep learning is now seen everywhere and becomes indispensable with the development of artificial intelligence technology. Many extensible deep learning systems, such as TensorFlow, MXNet, Caffe and PyTorch, are generated therefrom. The deep learning systems may be used for providing various neural network models that can be run on a processor like CPU or GPU. Generally, when the processor runs a neural network model, such as a Caffe network model, it is necessary that each of compute nodes in the neural network model is compiled and analyzed every time. After that, each of the compute nodes may be executed in a certain form according to the form of the structure of the neural network model. The neural network model and the network structure may be trained or untrained artificial neural network model data. The above-mentioned neural network processing method may affect processing speed of the processor and cause low processing efficiency.

SUMMARY

In view of this, the present disclosure provides a neural network processing method, a computer system and a storage medium to increase speed and efficiency for processing a neural network.

The present disclosure provides a neural network processing method which may include:
  acquiring a model dataset and model structure parameters of an original neural network, where the model dataset may include network weights corresponding to respective compute nodes in the original neural network, and the model structure parameters may include connections among a plurality of compute nodes in the original neural network;
  acquiring operational attributes of the respective compute nodes in the original neural network, where the operational attributes of the respective compute nodes may include a first operational attribute configured to represent that the compute nodes can be executed on an application specific neural network processor, and a second operational attribute configured to represent that the compute nodes can be executed on a general purpose processor;
  running the original neural network to acquire instructions corresponding to the respective compute nodes in the original neural network according to the model dataset, the model structure parameters, and the operational attributes of the respective compute nodes; and
  if an operational attribute of a current compute node is the first operational attribute, storing a network weight and an instruction corresponding to the current compute node in a first nonvolatile memory to acquire a first offline model corresponding to the original neural network.

In an example, it is determined whether the respective compute nodes can be executed on the application specific neural network processor.

If the current compute node can be executed on the application specific neural network processor, the current compute node is marked with the first operational attribute.

If the current compute node can be executed on the general purpose processor only, the current compute node is marked with the second operational attribute.

In an example, it is searched whether the current compute node has an equivalent compute node via a preset function table, where the equivalent compute node is a compute node which can be executed on the application specific neural network processor.

If the current compute node has the equivalent compute node, it is determined that the current compute node can be executed on the application specific neural network processor.

If the current compute node does not have the equivalent compute node, it is determined that the current compute node can be executed merely on the general purpose processor.

In an example, the operational attributes of the respective compute nodes in the original neural network may be acquired from the model dataset or the model structure parameters of the original neural network.

In an example, the general purpose processor may include one or more of a central processing unit (CPU), a graphics processing unit (GPU), a digital signal processor (DSP), and a field programmable gate array (FPGA).

The second operational attribute may include one or more of a CPU operational attribute, a GPU operational attribute, a DSP operational attribute, and an FPGA attribute.

In an example, all of first compute nodes among more than two second compute nodes, which are executed in order, may be made equivalent to a first offline node. Each of the first compute nodes is a compute node having the first operational attribute, and each of the second compute nodes is a compute node having the second operational attribute. The first offline model may further include interface data among the first offline nodes and the second compute nodes.

In an example, if the operational attribute of the current compute node is the second operational attribute, the network weight and the instruction corresponding to the current compute node may be stored in a second nonvolatile memory to acquire a second offline model corresponding to the original neural network.

In an example, all of second compute nodes among more than two first compute nodes, which are executed in order, may be made equivalent to a second offline node. Each of the first compute nodes may be a compute node having the first operational attribute, and each of the second compute node may be a compute node having the second operational attribute. The second offline model may further include interface data among the second offline nodes and the first compute nodes.

In an example, order of execution of the respective compute nodes in the original neural network may be acquired according to the model structure parameters of the original neural network.

Target processors corresponding to the respective compute nodes may be acquired according to the operational attributes of the respective compute nodes.

The respective compute nodes may be executed via the target processors corresponding to the respective compute nodes, according to the order of execution of the respective compute nodes in the original neural network, to acquire the instructions corresponding to the respective compute nodes in the original neural network.

In an example, a memory allocation manner of the original neural network may be acquired according to the model dataset and the model structure parameters of the original neural network.

Related data during running of the original neural network may be stored in a first memory according to the memory allocation manner, where the related data during running of the original neural network may include the network weights, the instructions, input data and output data corresponding to the respective compute nodes of the original neural network.

The network weights and the instructions corresponding to the respective compute nodes having the first operational attribute in the original neural network may be acquired from the first memory and stored in the first nonvolatile memory to generate the first offline model.

The network weights and the instructions corresponding to the respective compute nodes having the second operational attribute in the original neural network may be acquired from the second memory, and the network weights corresponding to the respective compute nodes having the second operational attribute in the original neural network may be stored in a second nonvolatile memory to generate the second offline model.

The present disclosure provides a neural network processing method which may include:
  acquiring a model dataset and model structure parameters of an original neural network, where the model dataset may include network weights corresponding to respective compute nodes in the original neural network, and the model structure parameters may include connections among a plurality of compute nodes in the original neural network;
  making all of first compute nodes among more than two second compute nodes, which are executed in order, equivalent to a first offline node to acquire an equivalent network corresponding to the original neural network according to the connections among the plurality of compute nodes in the original neural network, where each of the first compute nodes may be a compute node having a first operational attribute, and each of the second compute nodes may be a compute node having a second operational attribute; and
  if a current compute node in the equivalent network is a first offline node, acquiring a first offline model from a first nonvolatile memory, and executing the first offline node according to the first offline model, where the first offline model may include network weights and instructions corresponding to all of the first compute nodes in the original neural network.

In an example, the first offline model may further include interface data among the first offline node and the second compute nodes.

In an example, if the current compute node in the equivalent network is not the first offline node, a second offline model may be acquired from a second nonvolatile memory, and the current compute node in the equivalent network may be executed according to the second offline model.

In an example, the present disclosure may further provide a neural network processing method which may include:
  acquiring a model dataset and model structure parameters of an original neural network, where the model dataset may include network weights corresponding to respective compute nodes in the original neural network, and the model structure parameters may include connections among a plurality of compute nodes and computational attributes of the respective compute nodes in the original neural network;
  running the original neural network according to the model dataset and the model structure parameters of the original neural network to acquire instructions corresponding to the respective compute nodes in the original neural network; and
  generating an offline model corresponding to the original neural network according to the network weights and the instructions corresponding to the respective compute nodes of the original neural network, and storing the offline model corresponding to the original neural network in an nonvolatile memory.

In an example, order of execution of the respective compute nodes in the original neural network may be acquired according to the model structure parameters of the original neural network.

The original neural network may be run according to the order of execution of the respective compute nodes in the original neural network to acquire the instructions corresponding to the respective compute nodes in the original neural network.

In an example, a memory allocation manner of the original neural network may be acquired according to the model dataset and the model structure parameters of the original neural network.

Related data during running of the original neural network may be stored in a first memory according to the memory allocation manner of the original neural network, where the related data during running of the original neural network may include network weights, instructions, input data and output data corresponding to the respective compute nodes of the original neural network.

The network weights and the instructions corresponding to the respective compute nodes of the original neural network may be acquired from the first memory and stored in a second memory to generate the offline model, where the second memory may be a nonvolatile memory.

In an example, the offline model may further include node interface data, which is configured to represent connections among the respective compute nodes of the original neural network.

In an example, a processor or a virtual device of a computer system may run the original neural network according to the model dataset and the model structure parameters of the original neural network.

In an example, a model dataset and model structure parameters of a new original neural network may be acquired.

If the new original neural network has a corresponding offline model, the corresponding offline model of the new original neural network may be acquired from the nonvolatile memory, and the new original neural network may be run according to the corresponding offline model of the new original neural network.

If the new original neural network does not have a corresponding offline model of the new original neural network, the new original neural network may be run according to the model dataset and the model structure parameters of the new original neural network, and a corresponding offline model of the new original neural network may be generated and stored in the nonvolatile memory.

The present disclosure provides a neural network processing method which may further include:
  acquiring model structure parameters of an original neural network, where the model structure parameters may include connections among a plurality of compute nodes in the original neural network;

acquiring an offline model corresponding to the original neural network from an nonvolatile memory, where the offline model corresponding to the original neural network may include network weights and instructions corresponding to respective compute nodes of the original neural network; and running the original neural network according to the offline model corresponding to the original neural network and the model structure parameters of the original neural network.

The present disclosure provides a computer system which may include:

a first processor, a first memory and a second memory corresponding to the first processor; and one or more second processors, and one or more third memories corresponding to the second processors, where each of the second processors may be connected to the first processor, where a computer program may be stored in the first memory or the second memory, and the first processor may implement the steps of the method in any example mentioned above when executing the computer program.

The present disclosure may provide a computer storage medium, where a computer program is stored. The computer program may implement the steps of the method in any example mentioned above when it is executed by one or more first processors.

Details of one or more examples of the present disclosure will be provided in the following drawings and description. Other features, objectives and advantages of the disclosure will be apparent from the description, drawings and claims.

BRIEF DESCRIPTION OF THE DRAWINGS

In order to clearly explain the technical solutions of the examples in the present disclosure or in the prior art, the drawings to be used for description of the examples or the prior art will be briefly introduced. Obviously, the drawings to be described below are directed to the examples in the present disclosure only. A person of ordinary skill in the art may obtain any other drawings according to the disclosed drawings without any inventive work.

DETAILED DESCRIPTION

Figure 1:
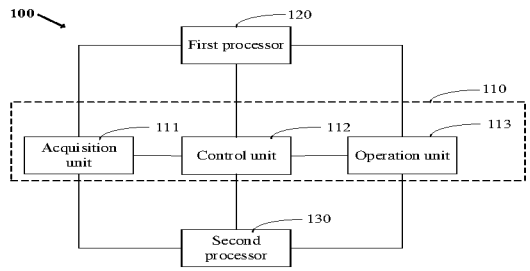
FIG. 1 is a block diagram of a computer system according to an example.

The technical solutions in the examples of the present disclosure will be described clearly and completely referring to the drawings used in the examples of the present disclosure. Obviously, the described examples are merely some of, but not all of the examples in the present disclosure. Every other example obtained by the ordinary person skilled in the art based on the examples in the present disclosure without any inventive work falls into the extent of protection claimed by the present disclosure.

FIG. 1 is a block diagram of a computer system according to an example. The computer system may include a processor 110, and a first memory 120 and a second memory 130 that are connected to the processor 110. The processor 110 may be configured to provide computation and control capabilities and may include an acquisition unit 111, an operation unit 113, a control unit 112, etc. The acquisition unit 111 may be a hardware unit, such as an IO (Input/Output) interface, and the operation unit 113 and the control unit 112 may both be hardware units. For instance, each of the operation unit 113 and the control unit 112 may be a digital circuit or an analog circuit, or the like. The physical implementation of the hardware circuits may include, but is not limited to, physical devices, and the physical devices may include, but are not limited to, transistors and memristors, and the like.

Optionally, the processor may be a general-purpose processor, such as a CPU (Central Processing Unit), a GPU (Graphics Processing Unit), or a DSP (Digital Signal Processor). The processor may also be an application specific neural network processor, such as an IPU (Intelligence Processing Unit). Of course, the processor may also be an instruction set processor, a related chipset, an application specific microprocessor (such as an application specific integrated circuit (ASIC)), or an onboard memory for caching use, or the like.

The first memory or the second memory may store a computer program, which is configured to implement a neural network processing method provided in an example of the present disclosure. Specifically, the neural network processing method may be configured to generate an offline model corresponding to an original neural network received by the processor. The offline model corresponding to the original neural network may include necessary network structure information, such as network weights and instructions corresponding to respective compute nodes in the original neural network. Each of the compute nodes may include one or more operations and instructions in accordance with neural network algorithms. The instructions may be configured to indicate a kind of computation operations to be executed by the compute nodes. The offline model may specifically include information such as computational attributes of the respective compute nodes, and connections among the respective compute nodes in the original neural network. Consequently, when the processor run the original neural network again, the offline model corresponding to the original neural network may be run directly without the need of performing an operation, such as compiling, on the same original neural network again. Therefore, it is possible to reduce run duration of the network by the processor, and thus to increase the processing speed and efficiency of the processor.

Further, the first memory 120 may be an internal memory, such as a volatile memory including a cache memory, which may be configured to store related data, such as network input data, network output data, network weights, instructions, etc., during running of the neural network. The second memory 130 may be an external memory, such as a non-volatile memory, which is configured to store an offline model corresponding to the neural network. When it is required to compile, by the computer system, the same original neural network again to run the original neural network, the offline model corresponding to the original neural network may be acquired directly from the second memory. Therefore, the processing speed and efficiency of the processor may be increased.

Figure 2:
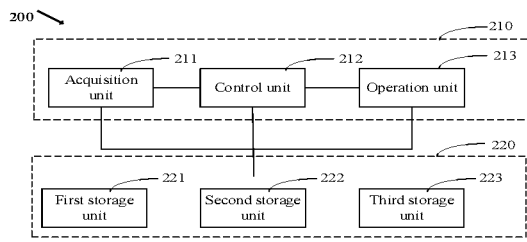
FIG. 2 is a block diagram of a computer system according to another example.

Of course, in another example the computer system may also include a processor and a memory. As shown in FIG. 2, the computer system may include a processor 210 and a memory 220 connected to the processor 210. The processor 210 may include an acquisition unit 211, a control unit 212 and an operation unit 213. The structure of the processor 210 may be similar to that of the processor 110, which may be seen above. The memory 220 may include a first storage unit 221, a second storage unit 222, and a third storage unit 223. The first storage unit 221 may be configured to store a computer program, which is configured to implement the neural network processing method provided in the example of the present disclosure. The second storage unit 222 may be configured to store related data during running of the original neural network, and the third storage unit 223 may be configured to store the offline model corresponding to the original neural network. Further, a count of the storage units included in the memory may be greater than three; however, it is not specifically limited here.

It should be clear that running of the original neural network in the present example means that the processor may run a machine learning algorithm (such as a neural network algorithm) using artificial neural network model data and implement a target application of the algorithm (such as an artificial intelligence application, like speech recognition) by executing forward operation. In this example, directly running the offline model corresponding to the original neural network means that a machine learning algorithm (such as a neural network algorithm) corresponding to the original neural network may be run by using the offline model, and a target application of the algorithm (such as an artificial intelligence application, like speech recognition) may be implemented by executing forward operation.

Figure 3:
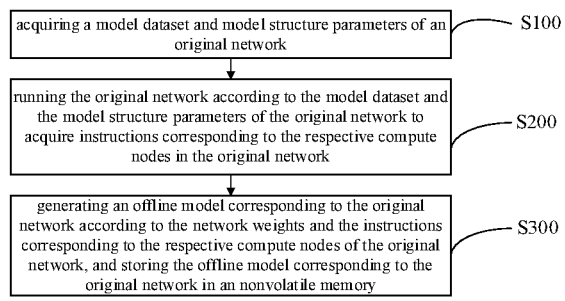
FIG. 3 is a flow chart of a neural network processing method according to an example.

As shown in FIG. 3, a neural network processing method in an example of the present disclosure may be configured to generate and store the offline model corresponding to the original neural network according to the acquired data related to the original neural network. Consequently, the offline model corresponding to the original neural network may be run directly without the need of performing an operation, such as compiling, on the same original neural network again. Therefore, it is possible to reduce run duration of the network by the processor, and thus to increase the processing speed and efficiency of the processor. Specifically, the method may include:

S100: acquiring a model dataset and model structure parameters of the original neural network. Specifically, an acquisition unit of the processor may acquire a model dataset and model structure parameters of the original neural network, and a diagram of network structure of the original neural network may be obtained through the model dataset and the model structure parameters of the original neural network. The model dataset may include data like network weights corresponding to the respective compute nodes in the original neural network.

Figure 7:
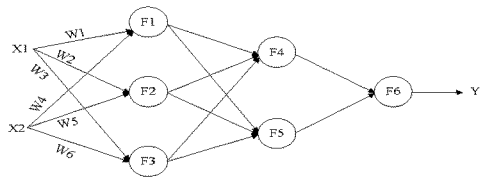
FIG. 7 is a diagram of a network structure of a neural network according to an example.

As shown in FIG. 7, the original neural network may include a plurality of compute nodes. Each compute node may indicate one or more operations and instructions in accordance with neural network algorithms. For example, computes nodes of the original neural network are donated as F1, F2, F3, F4, F5, F6, furthermore, the compute node of the original neural network may be a convolutional operator, a pooling operator, or an activation operator.

W1~W6 in the neural network shown in FIG. 7 represent network weights of the compute nodes. The model structure parameters may include connections among a plurality of compute nodes, and the computational attributes of the respective compute nodes in the original neural network. The connections among the respective compute nodes may be configured to represent whether data is transmitted among the compute nodes. For instance, if a data stream is transmitted among a plurality of compute nodes, the plurality of compute nodes may be connected. Further, connections among the respective compute nodes may include input relation, output relation, etc. As shown in FIG. 7, output of compute node F1 may serve as input of compute nodes F4 and F5. This suggests that the compute node F1 may be connected to the compute node F4, and the compute node F1 is connected to the compute node F5. For another instance, if data is not transmitted between the compute node F1 and compute node F2, the compute node F1 may be not connected to the compute node F2.

Computational attributes of the respective compute nodes may include a computational type and computation parameters of the corresponding compute node. A computational type of the compute node refers to a kind of computation to be fulfilled by the compute node. For instance, the computational type of the compute node may include addition operation, subtraction operation, convolution operation, etc. Accordingly, the compute node may be a compute node configured to implement addition operation, a compute node configured to implement subtraction operation, a compute node configured to implement convolution operation, or the like. Computation parameters of a compute node may be necessary parameters required in implementation of the computational type corresponding to the compute node. For instance, the compute node of the computational type may be a compute node configured to implement addition operation, and accordingly, computation parameters of the compute node may be an added in addition operation, and an augend in the addition operation may be acquired, as input data, by the acquisition unit, or the augend in the addition operation may be output data of the compute node prior to this compute node, etc.

Optionally, the original neural network may be an artificial neural network established for a general purpose processor, such as a CPU, a GPU or a DSP, based on a deep learning system, such as TensorFlow, MXNet, Caffe or PyTorch. The original neural network may also be an artificial neural network established for an intelligent processor such as an IPU. For instance, in the case where the original neural network is a neural network established based on Caffe, a model dataset (caffemodel) and model structure parameters (prototxt) of the Caffe network may be acquired. The model dataset (caffemodel) includes data of the Caffe network such as network weights, and the model structure parameters (prototxt) include the computational attributes of the respective compute nodes, connections among a plurality of compute nodes, etc., of the Caffe network.

S200: running the original neural network according to the model dataset and the model structure parameters of the original neural network to acquire instructions corresponding to the respective compute nodes in the original neural network. Specifically, the operation unit of the processor may run the original neural network according to the model dataset and the model structure parameters of the original neural network, and acquire instructions corresponding to the respective compute nodes in the original neural network. Further, the acquisition unit of the processor may acquire input data of the original neural network, and the operation unit of the processor may run the original neural network according to the input data, the network model dataset and the model structure parameters of the original neural network so as to acquire the instructions corresponding to the respective compute nodes in the original neural network. Furthermore, the process of running the original neural network to acquire the instructions of the respective compute nodes is substantially a process of compiling, which may be implemented by a processor or a virtual device of a computer system. In other words, the processor or the virtual device of the computer system may run the original neural network according to the model dataset and the model structure parameters of the original neural network. The virtual device refers to a processor running space virtualized in the memory space of the memory.

It should be clear that running the original neural network in this example means that the processor may run a machine learning algorithm (such as a neural network algorithm) using artificial neural network model data, and implement a target application of the algorithm (such as an artificial intelligence application, like speech recognition) by executing a forward operation.

S300: generating an offline model corresponding to the original neural network according to the network weights and the instructions corresponding to the respective compute nodes of the original neural network, and storing the offline model corresponding to the original neural network in a nonvolatile memory (such as a database). Specifically, the control unit of the processor may generate an offline model corresponding to the original neural network according to the network weights and the instructions corresponding to the respective compute nodes of the original neural network. For instance, the control unit of the processor may store the network weights and the instructions corresponding to the respective compute nodes of the original neural network in the second memory, which may be nonvolatile, to generate and store the offline model. For every compute node of the original neural network, the network weight and instruction of the compute node may be stored in one-to-one correspondence. In this way, when the original neural network is run again, the offline model corresponding to the original neural network may be acquired from the nonvolatile memory directly, and the original neural network may be run according to the offline model corresponding to the original neural network without the need of acquiring instructions by compiling online the respective compute nodes of the original neural network. Therefore, the running speed and efficiency of the system may be increased.

It should be clear that in this example, directly running the offline model corresponding to the original neural network means that a machine learning algorithm (such as a neural network algorithm) corresponding to the original neural network may be run using the offline model, and a target application of the algorithm (such as an artificial intelligence application, like speech recognition) may be implemented by executing a forward operation.

Figure 4:
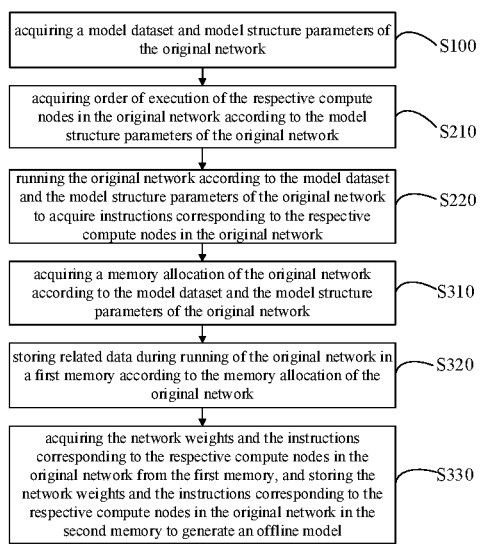
FIG. 4 is a flow chart of a neural network processing method according to another example.

Optionally, as shown in FIG. 4, the step S200 may include:

S210: acquiring order of execution of the respective compute nodes in the original neural network according to the model structure parameters of the original neural network. Specifically, the operation unit of the processor may acquire order of execution of the respective compute nodes in the original neural network according to the model structure parameters of the original neural network, and further, the operation unit of the processor may acquire order of execution of the respective compute nodes in the original neural network according to connections among the respective compute nodes in the original neural network. For instance, as shown in FIG. 7, input data of compute node F4 may be output data of compute node F1 and output data of compute node F2, input data of compute node F6 may be output data of the compute node F4 and output data of compute node F5. Therefore, the order of execution of the respective compute nodes in the original neural network as shown in FIG. 7 may be F1-F2-F3-F4-F5-F6 or F1-F3-F2-F5-F4-F6, or the like. Of course, the compute nodes F1, F2 and F3 may be executed in parallel, and the compute nodes F4 and F5 may be executed in parallel. The order of execution is explained only by way of example, but is not specifically limited.

S220: running the original neural network according to the order of execution of the respective compute nodes in the original neural network to acquire instructions corresponding to the respective compute nodes in the original neural network. Specifically, the operation unit of the processor may run the original neural network according to the order of execution of the respective compute nodes in the original neural network so as to acquire instructions corresponding to the respective compute nodes in the original neural network. In other words, the processor may compile data such as the model dataset of the original neural network to acquire the instructions corresponding to the respective compute nodes, and it may be learnt, from the instructions corresponding to the respective compute nodes, what kind of computational operation is to be implemented by the compute node. In other words, computational attributes of the compute node, such as computational type and computation parameters may be acquired Further, as shown in FIG. 4, the step S300 may further include:

S310: acquiring a memory allocation manner of the original neural network according to the model dataset and the model structure parameters of the original neural network. Specifically, the operation unit of the processor may acquire a memory allocation manner of the original neural network according to the model dataset and the model structure parameters of the original neural network. Further, the processor may acquire order of execution of the respective compute nodes in the network according to the model structure parameters of the original neural network, and determine the memory allocation manner of the current network according to the order of execution of the respective compute nodes in the original neural network. For instance, data related to the respective compute nodes during the running may be stored in a stack according to the order of execution of the respective compute nodes. The memory allocation manner refers to determining the position where the data (including input data, output data, network weight data and intermediate result data, etc.) related to the respective compute nodes in the original neural network may be stored in the memory space (such as the first memory). For instance, a data table may be used for storing mappings between the data related to the respective compute nodes (input data, output data, network weight data, intermediate result data, etc.) and the memory space.

S320: storing related data during running of the original neural network in the first memory according to the memory allocation manner of the original neural network. The related data during running of the original neural network may include network weights, instructions, input data, intermediate computation result, output data, etc. For instance, as shown in FIGS. 7, X1 and X2 represent input data of the neural network, and Y represents output data of the neural network; the processor may convert the output data of the neural network into control commands for controlling a robot or different digital interfaces. W1~W6 represent network weights corresponding to the compute nodes F1, F2, and F3. Output data of the compute nodes F1~F5 may serve as intermediate computation results. The processor may store the related data during running of the original neural network in the first memory, such as a volatile memory (an internal memory and a cache memory, or the like). Detailed storage of the related data may be seen in the left part of memory space shown in FIG. 8.

S330: acquiring the network weights and the instructions corresponding to the respective compute nodes in the original neural network from the first memory, and storing the network weights and the instructions corresponding to the respective compute nodes in the original neural network in the second memory to generate an offline model. The second memory may be a nonvolatile memory, such as an external memory. The generation of the offline model may be seen in FIG. 8, where the memory space in the right part of FIG. 8 may be configured to store the offline model corresponding to the original neural network.

Figure 8:
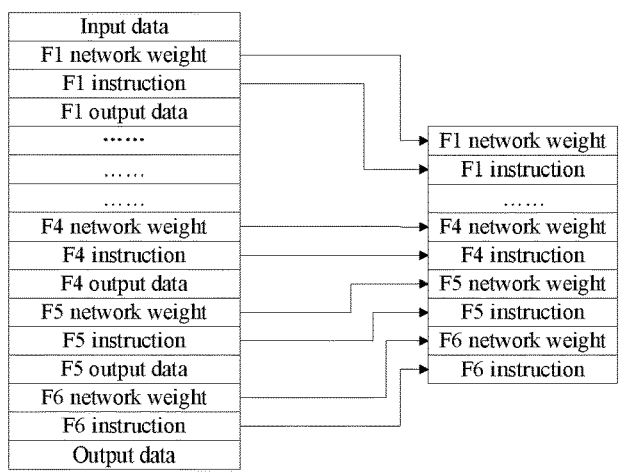
FIG. 8 is a schematic diagram of generation of an offline model of the neural network according to FIG. 7.

The above-mentioned generation of the offline will be explained as below referring to FIG. 7 and FIG. 8.

Firstly, the processor may acquire the model dataset, the model structure parameters and the input data of the original neural network so as to acquire a diagram of network structure of the original neural network according to the model dataset and the model structure parameters of the original neural network as shown in FIG. 7.

Secondly, the processor may acquire connections among the respective compute nodes of the original neural network according to the model structure parameters of the original neural network, and acquire order of execution of the respective compute nodes in the original neural network and the memory allocation manner during the running of the original neural network according to the connections among the respective compute nodes so as to acquire the position where the related data may be stored during running of the original neural network. As shown in the memory space of the left part of FIG. 8, the related data during running of the original neural network may be stored in a stack according to the order of execution of the respective compute nodes.

Finally, the processor may store the network weights and the instructions corresponding to the respective compute nodes in the original neural network in the second memory, which is nonvolatile, to generate the offline model. The storage of the offline model is shown in the memory space of the right part of FIG. 8. Moreover, the offline model may merely include data such as network weights and instructions that are necessary in the original neural network without storing input data, output data or intermediate computation result during running of the original neural network. Therefore, the consumption of memory space in the second memory may be reduced.

As a further improvement, the offline model may further include node interface data configured to represent connections among the respective compute nodes of the original neural network. Specifically, the node interface data may include input data sources and output data sources of the respective compute nodes. For instance, as shown in FIG. 7, the node interface data may include compute nodes F1, F2 and F3 as start nodes. Input of these compute nodes may be preset input data, and output data of the compute node F1 may serve as input data of compute nodes F4 and F5. In this way, when the original neural network is run again, the original neural network may be executed according to the offline model corresponding to the original neural network as long as the start compute nodes of the original neural network and input data of the start compute nodes may be acquired.

Figure 5:
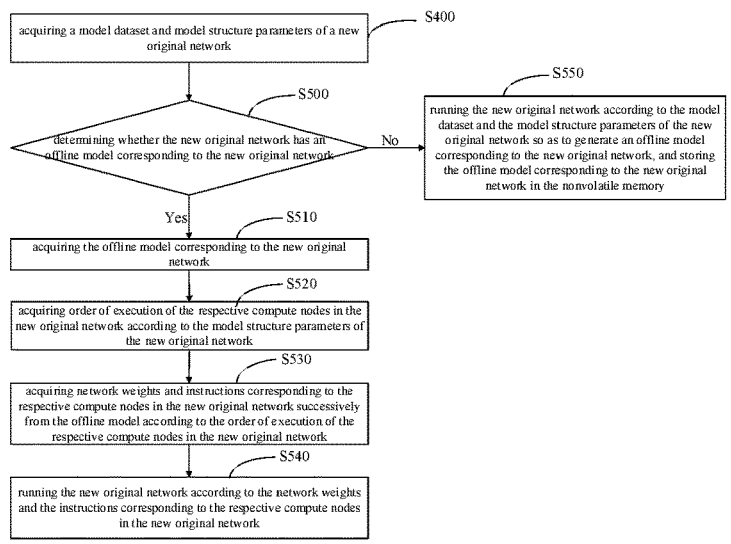
FIG. 5 is a flow chart of a neural network processing method according to another example.

In an example, after the offline model is generated, operation may be executed immediately using the offline model, or the offline model may be stored for use in computation as needed. As shown in FIG. 5, the method may further include the following steps:

S400: acquiring a model dataset and model structure parameters of a new original neural network. Specifically, the acquisition unit of the processor may acquire a model dataset and model structure parameters of a new original neural network, and a diagram of network structure of the new original neural network may be acquired through the model dataset and the model structure parameters of the new original neural network.

S500: determining whether the new original neural network has a corresponding offline model. Specifically, whether the new original neural network has a corresponding offline model is determined by determining whether the model dataset of the new original neural network is same as the model dataset of the original neural network, and whether the model structure parameters of the new original neural network are same as the model structure parameters of the original neural network. If the model dataset of the new original neural network is same as the model dataset of the original neural network, and the model structure parameters of the new original neural network are same as the model structure parameters of the original neural network, it may be considered that the new original neural network and the original neural network are the same network. In this case, it is determined that the new original neural network has a corresponding offline model.

If the new original neural network does not have a corresponding offline model of the new original neural network, S550 may be implemented to run the new original neural network according to the model dataset and the model structure parameters of the new original neural network so as to generate a corresponding offline model of the new original neural network, and store the corresponding offline model of the new original neural network in the nonvolatile memory. Specifically, if the model dataset of the new original neural network is different from the model dataset of the original neural network, and/or the model structure parameters of the new original neural network are different from the model structure parameters of the original neural network, it may be considered that the original neural network and the new original neural network are different networks, and the new original neural network does not have an offline model. If the new original neural network does not have an offline model, the steps S100~S300 may be implemented. The specific implementation of steps S100~S300 may be seen above and thus is omitted here.

Further, it may be determined whether the new original neural network the new original neural network has a corresponding offline model by performing a plurality of transversal operations on a data set including a plurality of offline models or by performing transversal operation on a plurality of datasets including a plurality of offline models.

If the new original neural network has an offline model, the corresponding offline model of the new original neural network may be acquired from the nonvolatile memory, and the new original neural network may be run according to the corresponding offline model of the new original neural network. Specifically, if the new original neural network has an offline model, the following steps may be implemented:

S510: acquiring the corresponding offline model of the new original neural network. Specifically, the acquisition unit of the processor may read the corresponding offline model of the new original neural network from the second memory. In other words, the acquisition unit of the processor may read the network weights and the instructions corresponding to the respective compute nodes in the original neural network from the second memory.

S520: acquiring order of execution of the respective compute nodes in the new original neural network according to the model structure parameters of the new original neural network. Specifically, the operation unit of the processor may acquire order of execution of the respective compute nodes in the new original neural network according to the connections among the respective compute nodes in the new original neural network. The specific implementation is similar to the above-mentioned step S210.

S530: acquiring network weights and instructions corresponding to the respective compute nodes in the new original neural network successively from the offline model according to the order of execution of the respective compute nodes in the new original neural network. Specifically, the acquisition unit of the processor may acquire network weights and instructions corresponding to the respective compute nodes in the new original neural network successively from the offline model according to the order of execution of the respective compute nodes in the new original neural network.

S540: running the new original neural network according to the network weights and the instructions corresponding to the respective compute nodes in the new original neural network. Specifically, the operation unit of the processor may run the new original neural network directly according to the network weights and the instructions corresponding to the respective compute nodes in the new original neural network without repeating the compiling of the respective compute nodes.

For instance, as shown in FIG. 7, the order of execution of the respective compute nodes in the neural network may be F1-F2-F3-F4-F5-F6. In the case where the neural network has an offline model, the network weight and the instruction corresponding to the compute node F1 may be acquired from the offline model, and network weights and instructions corresponding to the respective compute nodes F2~F6 may be acquired successively. Therefore, the compute nodes in the new original neural network may be run successively without repeating the compiling of the respective compute nodes in the new original neural network. Therefore, running speed and efficiency of the processor may be increased.

In an example, the offline model may further include node interface data configured to represent connections among the respective compute nodes in the original neural network. For instance, the node interface data may include input data sources and output data sources of the respective compute nodes. In this case, running the new original neural network according to the offline model corresponding to the original neural network may include:

acquiring a corresponding offline model of the new original neural network. Specifically, the acquisition unit of the processor may acquire a corresponding offline model of the new original neural network from the second memory, the offline model including node interface data.

acquiring a start compute node of the new original neural network according to model structure parameters of the new original neural network. Specifically, the operation unit of the processor may acquire a start compute node of the new original neural network according to the model structure parameters of the new original neural network. Input data of the start compute node, such as input data of compute nodes F1, F2 and F3, may be network input data, and no any other compute node exists before the start compute node.

acquiring network weights and instructions corresponding to the respective compute nodes of the new original neural network successively from the offline model according to the start compute node of the new original neural network and the node interface data in the offline model. Specifically, the acquisition unit of the processor may acquire network weights and instructions corresponding to the respective compute nodes of the new original neural network from the offline model according to the start compute node of the new original neural network and the node interface data in the offline model.

running the new original neural network according to the network weights and the instructions corresponding to the respective compute nodes of the new original neural network. Specifically, the operation unit of the processor may run the new original neural network according to the network weights and the instructions corresponding to the respective compute nodes of the new original neural network.

For instance, the start compute nodes of the neural network shown in FIG. 7 may be compute nodes F1, F2 and F3. In the case where the neural network has an offline model, an instruction and a network weight of each of the start compute nodes F1, F2 and F3 may be acquired firstly from the offline model. Compute nodes F4 and F5 connected to the start compute nodes F1, F2 and F3 may be acquired according to the node interface data in the offline model. Therefore, instructions and network weights of the compute nodes F4 and F4 may be acquired. After that, compute node F6 connected to the compute nodes F4 and F5 may be acquired according to the node interface data in the offline model so as to acquire an instruction and a network weight of the compute node F6. In this way, the compute nodes of the new original neural network may be run successively without repeating the compiling of the respective compute nodes in the new original neural network. Therefore, running speed and efficiency of the processor may be increased.

Further, in the case where the offline model includes node interface data, the interface data may include the connections among the respective compute nodes in the original neural network, and information such as start compute nodes of the original neural network. In this case, running the new original neural network according to the offline model corresponding to the original neural network may include:

acquiring a corresponding offline model of the new original neural network. Specifically, the acquisition unit of the processor may read a corresponding offline model of the new original neural network from the second memory. The offline model may include node interface data, through which a start compute node of the new original neural network and connections among the rest of compute nodes may be acquired.

acquiring network weights and instructions corresponding to the respective compute nodes of the new original neural network successively from the offline model according to the start compute node of the new original neural network and the node interface data in the offline model. Specifically, the acquisition unit of the processor may acquire network weights and instructions corresponding to the respective compute nodes of the new original neural network successively from the offline model according to the start compute node of the new original neural network and the node interface data in the offline model.

running the new original neural network according to the network weights and the instructions corresponding to the respective compute nodes of the new original neural network. Specifically, the operation unit of the processor may run the new original neural network according to the network weights and the instructions corresponding to the respective compute nodes of the new original neural network.

Figure 6:
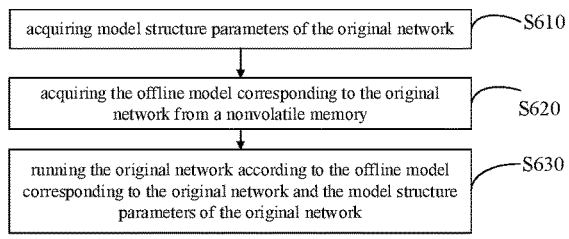
FIG. 6 is a flow chart of a neural network processing method according to another example.

In an example as shown in FIG. 6, the present disclosure further provides a neural network processing method, including:

S610: acquiring model structure parameters of the original neural network. The model structure parameters may include connections among a plurality of compute nodes in the original neural network. Specifically, the connections among the plurality of compute nodes may be configured to represent whether data is transmitted among the compute nodes. For instance, if a data stream is transmitted among a plurality of compute nodes, the plurality of compute nodes may be connected. Further, the connections among the respective compute nodes may include input relation, output relation, and the like.

S620: acquiring the offline model corresponding to the original neural network from a nonvolatile memory. The offline model corresponding to the original neural network may include the network weights and the instructions corresponding to the respective compute nodes in the original neural network. For every compute node of the original neural network, the network weight and instruction of the compute node may be stored in one-to-one correspondence. The processor may learn the kind of operation to be executed by the compute node from the instructions corresponding to the respective compute nodes. In other words, computational attributes, such as a computational type and computation parameters, of the compute node may be acquired.

S630: running the original neural network according to the offline model corresponding to the original neural network and the model structure parameters of the original neural network. Specifically, in this example, directly running the offline model corresponding to the original neural network means that a machine learning algorithm (such as a neural network algorithm) corresponding to the original neural network may be run using the offline model, and a target application of the algorithm (such as an artificial intelligence application, like speech recognition) may be implemented by executing forward operation.

In an example, the step S630 may be implemented through the steps S510~S540 as shown in FIG. 5. Specifically, the step S630 may include:

acquiring order of execution of the respective compute nodes in the original neural network according to the model structure parameters of the new original neural network. Specifically, the operation unit of the processor may acquire order of execution of the respective compute nodes in the original neural network according to the connections among the respective compute nodes in the original neural network. The detailed execution is similar to the step S210.

acquiring the network weights and the instructions corresponding to the respective compute nodes in the original neural network successively from the offline model according to the order of execution of the respective compute nodes in the original neural network. Specifically, the acquisition unit of the processor may acquire the network weights and the instructions corresponding to the respective compute nodes in the original neural network successively from the offline model according to the order of execution of the respective compute nodes in the original neural network.

running the original neural network according to the network weights and the instructions corresponding to the respective compute nodes in the original neural network. Specifically, the operation unit of the processor may run the original neural network directly according to the network weights and the instructions corresponding to the respective compute nodes in the original neural network without repeating the compiling of the respective compute nodes.

In an example, the offline model may further include node interface data, which is configured to represent connections among the respective compute nodes of the original neural network. For instance, the node interface data may include input data sources and output data sources of the respective compute nodes. In this case, running the original neural network according to the offline model corresponding to the original neural network and the model structure parameters of the original neural network may include:

acquiring a start compute node of the original neural network according to the model structure parameters of the original neural network. Specifically, the operation unit of the processor may acquire a start compute node of the original neural network according to the model structure parameters of the original neural network. Input data of the start compute node, such as input data of compute nodes F1, F2 and F3, may be network input data, and no any other compute node exists before the start compute node.

acquiring network weights and instructions corresponding to the respective compute nodes of the original neural network successively from the offline model according to the start compute node of the original neural network and the node interface data in the offline model. Specifically, the acquisition unit of the processor may acquire network weights and instructions corresponding to the respective compute nodes of the original neural network from the offline model according to the start compute node of the original neural network and the node interface data in the offline model.

running the original neural network according to the network weights and the instructions corresponding to the respective compute nodes of the original neural network.

Further, in the case where the offline model includes node interface data, running the original neural network according to the offline model corresponding to the original neural network and the model structure parameters may include:

acquiring network weights and instructions corresponding to the respective compute nodes of the original neural network successively from the offline model according to the start compute node of the original neural network and the node interface data in the offline model. Specifically, the acquisition unit of the processor may acquire network weights and instructions corresponding to the respective compute nodes of the original neural network successively from the offline model according to the start compute node of the original neural network and the node interface data in the offline model; and running the original neural network according to the network weights and the instructions corresponding to the respective compute nodes of the original neural network.

A person of ordinary skill in the art may understand that all or part of the procedures in the methods described in the above examples may be implemented by instructing related hardware via a computer program. The program may be stored in a computer-readable storage medium and may include the procedure of the example of each of the methods described above when it is executed. Any reference to the memory, storage, database or any other medium may include a nonvolatile and/or volatile memory, where the reference may be used in the examples provided in the present disclosure. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), or an external cache memory. By way of illustration but not limitation, RAM is available in many forms, such as a static RAM (SRAM), a dynamic RAM (DRAM), a synchronous DRAM (SDRAM), a double data rate SDRAM (DDRSDRAM), an enhanced SDRAM (ESRAM), a synchlink DRAM (SLDRAM), a Rambus direct RAM (RDRAM), a direct Rambus dynamic RAM (DRDRAM), Rambus dynamic RAM (RDRAM), etc.

Moreover, an example of the present disclosure further provides a computer system, including a processor, a first memory, and a second memory. A computer program may be stored in the first memory or the second memory. The processor may execute the method according to any of the above-mentioned examples when executing the computer program. Specifically, when the processor executes the computer program, the following steps may be implemented:

acquiring a model dataset and model structure parameters of an original neural network. Specifically, an acquisition unit of the processor may acquire a model dataset and model structure parameters of an original neural network, and a diagram of network structure of the network may be obtained through the model dataset and the model structure parameters of the original neural network. The model dataset may include data such as network weights corresponding to the respective compute nodes in the original neural network. The model structure parameters may include connections among a plurality of compute nodes, and computational attributes of the respective compute nodes in the original neural network. The connections among the respective compute nodes may be configured to represent whether data is transmitted among the compute nodes. The computational attributes of the respective compute nodes may include a computational type and computation parameters of the corresponding compute node. A computational type of a compute node means the kind of computation to be fulfilled by the compute node. For instance, the computational type of the compute node may include addition operation, subtraction operation, convolution operation, etc. Accordingly, the compute node may be a compute node for implementing addition operation, a compute node for implementing subtraction operation, a compute node for implementing convolution operation, or the like. Computation parameters of a compute node may be necessary parameters required in implementation of the computational type corresponding to the compute node.

running the original neural network according to the model dataset and the model structure parameters of the original neural network to acquire instructions corresponding to the respective compute nodes in the original neural network. Specifically, an operation unit of the processor may run the original neural network according to the model dataset and the model structure parameters of the original neural network, and acquire instructions corresponding to the respective compute nodes in the original neural network. Further, the acquisition unit of the processor may acquire input data of the original neural network, and the operation unit of the processor may run the original neural network according to the input data, the network model dataset and the model structure parameters of the original neural network so as to acquire instructions corresponding to the respective compute nodes in the original neural network. Furthermore, the process of running the original neural network to acquire the instructions of the respective compute nodes is actually a process of compiling, which may be implemented by a processor or a virtual device of a computer system. In other words, the virtual device or the processor of the computer system may run the original neural network according to the model dataset and the model structure parameters of the original neural network. The virtual device may refer to a processor running space virtualized in the memory space of the memory.

generating an offline model corresponding to the original neural network according to the network weights and the instructions corresponding to the respective compute nodes of the original neural network, and storing the offline model corresponding to the original neural network in a nonvolatile memory. Specifically, a control unit of the processor may generate an offline model corresponding to the original neural network according to the network weights and the instructions corresponding to the respective compute nodes of the original neural network. For instance, the control unit of the processor may store the network weights and the instructions corresponding to the respective compute nodes of the original neural network in a nonvolatile memory, such as a second memory, to generate and store the offline model. In this way, when the original neural network is run again, the original neural network may be run according to the offline model corresponding to the original neural network without acquiring instructions by compiling online the respective compute nodes of the original neural network. Therefore, the running speed and efficiency of the system may be increased.

Further, the computer system may be the computer system shown in FIG. 1 or FIG. 2, and the processor of the computer system may include one or combination of more of a central processing unit (CPU), a graphics processing unit (GPU), a digital signal processor (DSP), a field programmable gate array (FPGA) and an intelligent processor. It should be clear that the operating principle of the computer system in this example is basically consistent with the implementation of the steps of the above-mentioned method, which is seen in the above text and thus is omitted here.

In addition, an example of the present disclosure further provides a computer storage medium, in which a computer program may be stored. When the computer program is executed by one or more processors, the method as stated in any of the above-mentioned examples may be executed. The computer storage medium may include a nonvolatile and/or volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), or an external cache memory. By way of illustration but not limitation, a RAM is available in many forms, such as a static RAM (SRAM), a dynamic RAM (DRAM), a synchronous DRAM (SDRAM), a double data rate SDRAM (DDRSDRAM), an enhanced SDRAM (ESRAM), a synchlink DRAM (SLDRAM), a Rambus direct RAM (RDRAM), a direct Rambus dynamic RAM (DRDRAM), a Rambus dynamic RAM (RDRAM), etc.

The neural network processing method, the computer system and the storage medium may acquire the offline model corresponding to the original neural network by storing the instructions corresponding to the respective compute nodes generated during running of the original neural network and the network weights corresponding to the respective compute nodes of the original neural network. In this way, when the original neural network is run again, the offline model corresponding to the original neural network may be run directly without compiling related data including the model dataset and the model structure parameters of the original neural network. Therefore, the time for running the same network by the processor may be reduced, and the processing speed and efficiency of the processor may be therefore improved.

Figure 9:
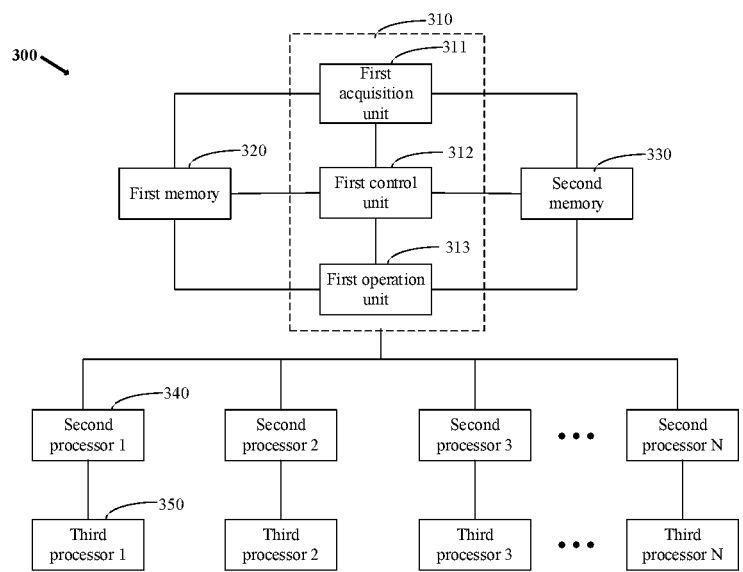
FIG. 9 is a block diagram of a computer system according to another example.

In another example of the present disclosure, the computer system may be a multi-online system formed by a plurality of processors. Each of the processors may include a host processor and one or more coprocessors, and at least one memory may be provided corresponding to the host processor and each of the one or more coprocessors. Specifically, as shown in FIG. 9, the computer system 300 may include a first processor 310, a first memory 320 and a second memory 330 connected to the first processor 310, one or more second processors 340 connected to the first processor 310, and third memories 350 corresponding to each of the second processors 340. The first processor 310 may be configured to provide computation and control capabilities and may include a first acquisition unit 311, a first operation unit 313, a first control unit 312, etc. The first acquisition unit 311 may be a hardware unit, such as an IO (Input/Output) interface, and the first operation unit 313 and the first control unit 312 may both be hardware units. For instance, each of the first operation unit 313 and the first control unit 312 may be a digital circuit or an analog circuit, or the like. The physical implementation of the hardware circuits may include, but is not limited to, physical devices, and the physical devices may include, but are not limited to, transistors, memristors, and the like.

Optionally, the first processor 310, which may serve as a host processor, may be a general purpose processor, such as a CPU (Central Processing Unit), a GPU (Graphics Processing Unit), a FPGA (Field-Programmable Gate Array), a DSP (Digital Signal Processor), or the like. The one or more second processors 340, which may serve as coprocessors, may be application specific neural network processors, such as an IPU (Intelligence Processing Unit). The second processors 340 may also be general purpose processors. Further, each of the second processors 340 may include a second acquisition unit, a second operation unit, a second control unit, etc. The second acquisition unit may be a hardware unit, such as an IO (Input/Output) interface, and the second operation unit and the second control unit are hardware units. For instance, each of the second operation unit and the second control unit may be a digital circuit, an analog circuit, or the like. The physical implementation of the hardware circuits may include, but is not limited to, physical devices, and the physical devices include, but are not limited to, transistors, memristors, and the like. The connections among the second acquisition unit, the second operation unit and the second control unit are similar to the connections among the units in the first processor, which may be seen above.

The first memory 320 or second memory 330 may store a computer program, which is configured to implement a neural network processing method provided in an example of the present disclosure. Specifically, the neural network processing method may be configured to generate an offline model corresponding to an original neural network received by the first processor. The offline model may include a first offline model, which may contain network weights and instructions corresponding to all of the compute nodes having a first operational attribute in the original neural network. Consequently, when the processor runs the original neural network again, the network weights and the instructions corresponding to all of the compute nodes having the first operational attribute in the original neural network may be acquired from the first offline model without the need of performing an operation, such as compiling, on the compute nodes having the first operational attribute in the same original neural network again. Therefore, it is possible to reduce run duration of the network by the processor, and thus to increase the processing speed and efficiency of the processor. Further, the offline model corresponding to the original neural network may also include a second offline model, which includes network weights and instructions corresponding to all of the compute nodes having a second operational attribute in the original neural network.

Further, the first memory 320 may be an internal memory, such as a volatile memory including a cache memory, which is configured to store related data during running of the neural network, such as network input data, network output data, network weights, instructions, etc. The second memory 330 and the third memory 350 may be external memories, such as nonvolatile memories. When it is required to compile, by the computer system, the same original neural network again so as to run the original neural network, the network weights and the instructions corresponding to the respective compute nodes in the original neural network may be acquired directly from the first offline model and the second offline model. Therefore, the processing speed and efficiency of the processor may be increased.

Figure 10:
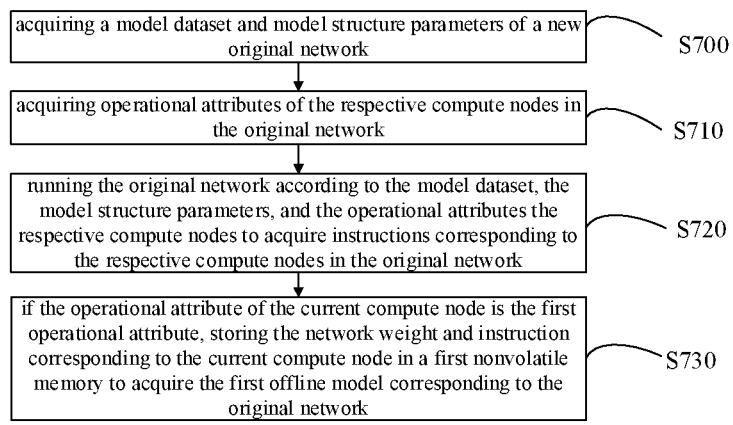
FIG. 10 is a flow chart of a neural network processing method according to an example.
Figure 14:
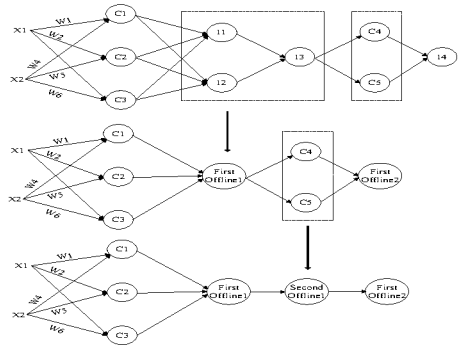
FIG. 14 is a diagram of a network structure and an equivalent network of a neural network according to an example.

In an example of the present disclosure, a neural network processing method according to an example may be used in the computer system shown in FIG. 9 to generate an offline model corresponding to an original neural network received by the first processor, thereby increasing the processing efficiency and speed of the computer system. Specifically, as shown in FIG. 10, the method may include:

S700: acquiring a model dataset and model structure parameters of the original neural network. The model dataset may include network weights corresponding to the respective compute nodes in the original neural network, and the model structure parameters may include connections among a plurality of compute nodes in the original neural network. Specifically, a first acquisition unit of the first processor may acquire a model dataset and model structure parameters of the original neural network, and a diagram of network structure of the network may be obtained through the model dataset and the model structure parameters of the original neural network. The model dataset may include data such as network weights corresponding to the respective compute nodes in the original neural network. W1~W6 in the neural network shown in FIG. 14 represent network weights of the compute nodes. The model structure parameters may include connections among the plurality of compute nodes, and computational attributes of the respective compute nodes in the original neural network. The connections among the compute nodes may be configured to represent whether data is transmitted among the compute nodes. For instance, if a data stream is transmitted among the plurality of compute nodes, connections may exist among the plurality of compute nodes. Further, the connections among the compute nodes may include input relation, output relation, etc. As shown in FIG. 14, output of compute node C1 may serve as input of compute nodes I1 and I2, which suggests that the compute node C1 may be connected to the compute node I1, and the compute node C1 may be connected to the compute node I2. For another example, if data is not transmitted between the compute node C1 and the compute node C2, the compute node C1 may be not connected to the compute node C2.

Computational attributes of the respective compute nodes may include computational types and computation parameters of corresponding compute nodes. A computational type of a compute node means the kind of computation to be fulfilled by the compute node. For instance, the computational type of the compute node may include addition operation, subtraction operation, convolution operation, etc. Accordingly, the compute node may be a compute node for implementing addition operation, a compute node for implementing subtraction operation, a compute node for implementing convolution operation, or the like. Computation parameters of a compute node may be necessary parameters required in implementation of the computational type corresponding to the compute node. For instance, the computational type of the compute node may be a compute node configured to implement addition operation, and accordingly, computation parameters of the compute node may be an added in addition operation, and an augend in the addition operation may be acquired by the acquisition unit as input data, or the augend in the addition operation may be input data of a compute node prior to this compute node, etc.

S710: acquiring operational attributes of the respective compute nodes in the original neural network. The operational attributes of the respective compute nodes may include a first operational attribute and a second operational attribute. Specifically, the first acquisition unit or a first operation unit of the processor may acquire operational attributes of the respective compute nodes in the original neural network. An operational attribute of a compute node may be configured to mark which processor the computation instruction corresponding to the compute node may be executed on. In this example, the first operational attribute may be configured to represent the capability that the computation instruction corresponding to the compute node may be executed on an application specific neural network processor, such as an IPU, and the a second operational attribute may be configured to represent the capability that the computation instruction corresponding to the compute node may be executed on a general purpose processor, such as a CPU, a GPU or a DSP.

Further, the operational attributes of the respective compute nodes may be represented and stored by enumerating. For instance, an enumeration variable device may be defined. The enumeration variable may include more than two enumeration values. If an operational attribute of a current compute node is the first operational attribute, an enumeration value of the enumeration variable may be 1; if the operational attribute of the current compute node is the second operational attribute, the enumeration value of the enumeration variable may be 0.

S720: running the original neural network according to the model dataset, the model structure parameters, and the operational attributes of the respective compute nodes to acquire instructions corresponding to the respective compute nodes in the original neural network. Specifically, the first operation unit of the first processor may run the original neural network according to the model dataset, the model structure parameters and the operational attributes of the respective compute nodes to acquire instructions corresponding to the respective compute nodes in the original neural network. Further, the first acquisition unit of the first processor may acquire input data of the original neural network, and the first operation unit of the first processor may run the original neural network according to the input data, the model dataset, the model structure parameters, and the operational attributes of the respective compute nodes in the original neural network to acquire instructions corresponding to the respective compute nodes in the original neural network. Furthermore, the process of running the original neural network to acquire the instructions corresponding to the respective compute nodes is substantially a process of compiling, which may be implemented by a processor or a virtual device of the computer system. In other words, the processor or the virtual device of the computer system may run the original neural network according to the model dataset and the model structure parameters of the original neural network. The virtual device may refer to a processor running space virtualized in the memory space of the memory.

It should be clear that running of the original neural network in this example means that the processor may run a machine learning algorithm (such a as neural network algorithm) using artificial neural network model data and implement a target application of the algorithm (such as an artificial intelligence application, like speech recognition) by executing forward operation.

S730: if the operational attribute of the current compute node is the first operational attribute, storing the network weight and instruction corresponding to the current compute node in a first nonvolatile memory to acquire a first offline model corresponding to the original neural network. Specifically, if the operational attribute of the current compute node is the first operational attribute, a first control unit of the first processor may store the network weight and instruction corresponding to the current compute node in the first nonvolatile memory to acquire a first offline model corresponding to the original neural network. The first nonvolatile memory may be a third memory corresponding to the application specific neural network processor, such as an IPU. Further, for every compute node of the original neural network, the network weight and instruction of the compute node may be stored in one-to-one correspondence. In this way, when the original neural network is run again, the first offline model corresponding to the original neural network may be acquired from the first nonvolatile memory, and all of the compute nodes having the first operational attribute in the original neural network may be run according to the first offline model without acquiring instructions by compiling online the compute nodes having the first operational attribute in the original neural network. Therefore, the running speed and efficiency of the system may be increased.

It should be clear that in this example, directly running the first offline model corresponding to the original neural network means that a machine learning algorithm (such as a neural network algorithm) corresponding to the original neural network may be run using the first offline model, and a target application of the algorithm (such as an artificial intelligence application, like speech recognition) may be implemented by executing forward operation.

Optionally, the operational attributes of the respective compute nodes may be pre-stored in the network structure parameters or model dataset of the original neural network. In this case, the operational attributes of the respective compute nodes in the original neural network may be acquired directly during reading of the original neural network. The step S710 may specifically include:

acquiring the operational attributes of the respective compute nodes in the original neural network from the network structure parameters or model dataset of the original neural network. Specifically, the operational attributes of the respective compute nodes may be pre-stored in the network structure parameters or model dataset of the original neural network. The first acquisition unit of the first processor may acquire the operational attributes of the respective compute nodes in the original neural network during acquiring of the network structure parameters or model dataset of the original neural network.

Optionally, the operational attributes of the respective compute nodes in the original neural network may be acquired in real time during acquiring of the original neural network by the first acquisition unit of the first processor. The step S710 may specifically include:

determining whether the respective compute nodes can be executed on an application specific neural network processor. Specifically, the first acquisition unit of the first processor may determine whether the respective compute nodes can be executed on an application specific neural network processor.

If the current compute node can be executed on an application specific neural network processor, the current compute node may be marked with the first operational attribute; if the current compute node can be executed on a general purpose processor only, the current compute node may be marked with the second operational attribute. Consequently, the operational attributes of the respective compute nodes in the original neural network may be determined in real time during reading of the original neural network by the first processor. For instance, if the operational attribute of the current compute node is the first operational attribute, the enumeration variable corresponding to the current compute node may be marked with 1; if the operational attribute of the current compute node is not the first operational attribute, the enumeration variable corresponding to the current compute node may be marked with 0.

Figure 12:
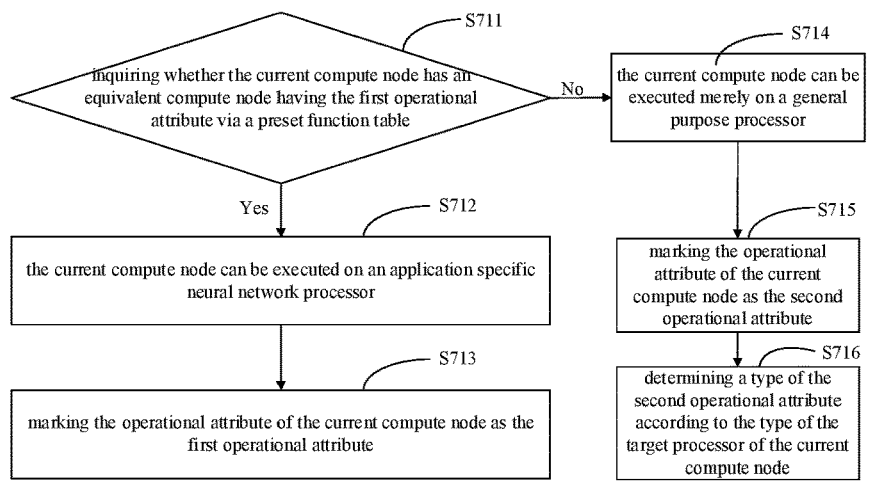
FIG. 12 is a flow chart of a neural network processing method according to an example.

Further, the first operation unit of the first processor may inquire whether the current compute node has an equivalent compute node having the first operational attribute via a preset function table. If the current compute node has an equivalent compute node having the first operational attribute, the operational attribute of the current compute node may be marked as the first operational attribute. If the equivalent compute node having the first operational attribute and matched with the current compute node is not found via the preset function table, it is considered that the operational attribute of the current compute node may be the second operational attribute. As shown in FIG. 12, the step S710 may further include:

S711: inquiring whether the current compute node has an equivalent compute node having the first operational attribute via a preset function table. The equivalent compute node may be a compute node that can be executed on an application specific neural network processor.

If the current compute node has an equivalent compute node, step S712 may be implemented to determine whether the current compute node can be executed on an application specific neural network processor. In this case, step S713 may be implemented to mark the operational attribute of the current compute node as the first operational attribute. Specifically, if the computation instruction corresponding to the current compute node can be converted into a computation instruction corresponding to the application specific neural network processor, it is considered that the current compute node may be an equivalent compute node having the first operational attribute, and the operational attribute of the current compute node may be marked as first operational attribute.

If the current compute node does not have the equivalent compute node, step S714 may be implemented to determine whether the current compute node can be executed merely on a general purpose processor, such as a CPU. In this case, step S715 may be implemented to mark the operational attribute of the current compute node as the second operational attribute. Specifically, if the computation instruction corresponding to the current compute node cannot be converted into a computation instruction corresponding to the application specific neural network processor, it is considered that the current compute node may not have an equivalent compute node having the first operational attribute, and the operational attribute of the current compute node may be marked as the second operational attribute.

Figure 11:
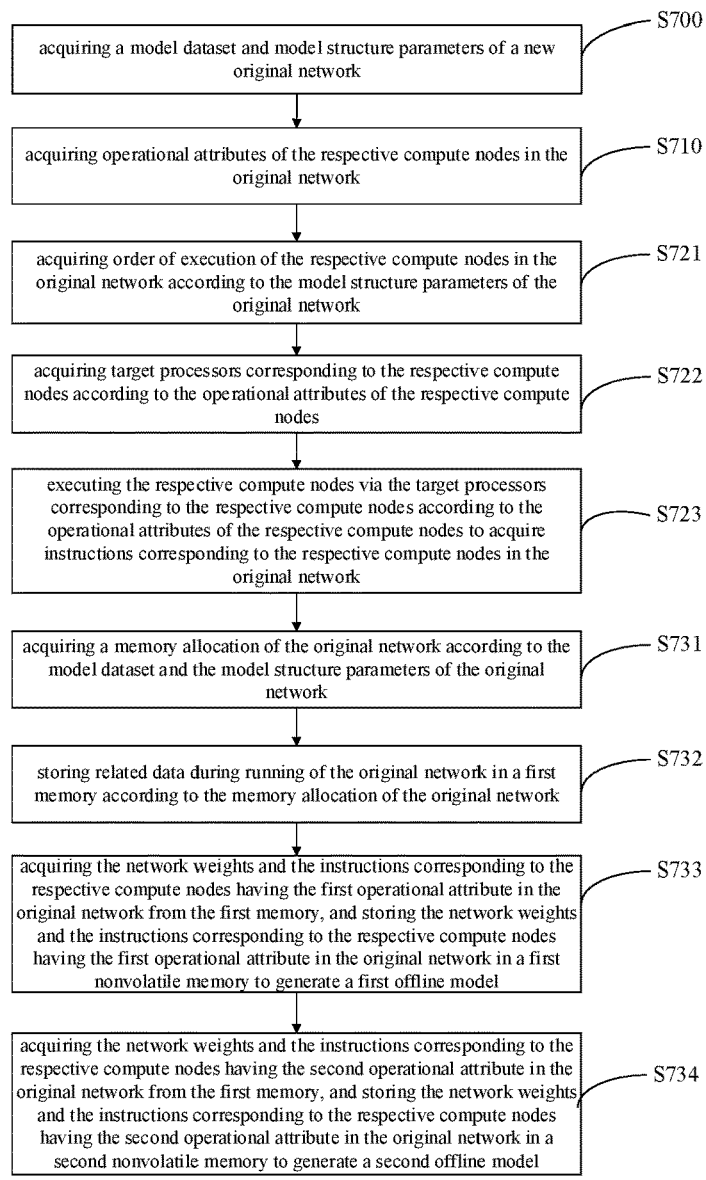
FIG. 11 is a flow chart of a neural network processing method according to an example.

In an example, as shown in FIG. 11, the step S720 may further include:

S721: acquiring order of execution of the respective compute nodes in the original neural network according to the model structure parameters of the original neural network. Specifically, the first operation unit of the first processor may acquire order of execution of the respective compute nodes in the original neural network according to the model structure parameters of the original neural network, and further, the first operation unit of the first processor may acquire the order of execution of the respective compute nodes in the original neural network according to the connections among the respective compute nodes in the original neural network. For instance, as shown in FIG. 14, input data of compute node I1 may be output data of compute node C1 and output data of compute node C2, and input data of compute node I3 may be output data of the compute node I1 and output data of compute node I2. Therefore, the order of execution of the respective compute nodes in the original neural network as shown in FIG. 14 may be C1-C2-C3-I1-I2-I3-C4-C5-I4, or the like. Of course, the compute nodes C1, C2 and C3 may be executed in parallel, and the compute nodes I1 and I2 may be executed in parallel. The example given here is merely for the purpose of explaining rather than limiting the order of execution.

S722: acquiring target processors corresponding to the respective compute nodes according to the operational attributes of the respective compute nodes. Specifically, the first operation unit of the first processor may acquire target processors corresponding to the respective compute nodes according to operational attributes of the respective compute nodes. For instance, in the case where the operational attribute of compute nodes C1~C5 is the second operational attribute (such as a CPU operational attribute), the target processor corresponding to the compute nodes C1~05 is a CPU, which may be a first processor, or a second processor serving as a coprocessor. In the case where the operational attribute of each of the compute nodes I1~I4 is the first operational attribute, the target processor corresponding to the compute nodes I1~I4 may be an application specific neural network processor, such as an IPU.

S723: executing the respective compute nodes via the target processors corresponding to the respective compute nodes according to the order of execution of the respective compute nodes in the original neural network to acquire instructions corresponding to the respective compute nodes in the original neural network. Specifically, if the target processor corresponding to the current compute node is an application specific neural network processor, such as an IPU, the first control unit of the first processor may control the application specific neural network processor serving as a coprocessor to execute the current compute node to acquire the instruction corresponding to the current compute node according to the order of execution of the respective compute nodes in the original neural network. If the target processor corresponding to the current compute node is a CPU, the CPU may be controlled to execute the current compute node to acquire the instruction corresponding to the current compute node. If the target processor corresponding to the current compute node is a GPU, the GPU may be controlled to execute the current compute node, or a general purpose processor, such as a CPU, may be controlled to execute the current compute node.

Further, as shown in FIG. 11, the step S730 may further include:

S731: acquiring a memory allocation manner of the original neural network according to the model dataset and the model structure parameters of the original neural network. Specifically, the first operation unit of the first processor may acquire a memory allocation manner of the original neural network according to the model dataset and the model structure parameters of the original neural network. Further, the first processor may acquire the order of execution of the respective compute nodes in the network according to the model structure parameters of the original neural network and determine the memory allocation manner of the current network according to order of execution of the respective compute nodes in the original neural network. For instance, data related to the respective compute nodes during the running may be stored in a stack according to the order of execution of the respective compute nodes. The memory allocation manner may refer to determining the position where the data (including input data, output data, network weight data, intermediate result data, etc.) related to the respective compute nodes in the original neural network is stored in the memory space (such as the first memory). For instance, a data table may be used for storing mappings between the data related to the respective compute nodes (input data, output data, network weight data and intermediate result data, etc.) and the memory space.

S732: storing related data during running of the original neural network in a first memory according to the memory allocation manner of the original neural network. The related data during running of the original neural network may include network weights, instructions, input data, and output data. For instance, as shown in FIGS. 14, X1 and X2 represent input data of the neural network, W1~W6 represent network weights corresponding to the compute nodes C1, C2 and C3, output data of the compute nodes I1~I3 and output data of the compute nodes C4 and C5 may serve as intermediate computation results. The first processor may store the related data during running of the original neural network in the first memory, such as a volatile memory (an internal memory or a cache memory, or the like). Detailed storage of the related data may be seen in the left part of memory space shown in FIG. 15.

S733: acquiring the network weights and the instructions corresponding to the respective compute nodes having the first operational attribute in the original neural network from the first memory, and storing, in the first nonvolatile memory, the network weights and the instructions corresponding to the respective compute nodes having the first operational attribute in the original neural network to generate a first offline model. The first nonvolatile memory may be a third memory corresponding to the application specific neural network processor. The generation of the first offline model may be seen in FIG. 15. The first offline model corresponding to the original neural network is stored in the memory space in the right part of FIG. 15.

The above-mentioned generation of the offline will be explained as below referring to FIG. 14 and FIG. 15.

Firstly, the first processor may acquire the model dataset, the model structure parameters and the input data of the original neural network, and may further acquire operational attributes of the respective compute nodes in the original neural network.

Secondly, the first processor may acquire the connections among the respective compute nodes of the original neural network according to the model structure parameters of the original neural network, and acquire the order of execution of the respective compute nodes in the original neural network according to the connections among the respective compute nodes and the memory allocation manner during the running of the original neural network so as to acquire the position where the related data is stored during running of the original neural network. As shown in the memory space of the left part of FIG. 15, the related data during running of the original neural network may be stored in a stack according to the order of execution of the respective compute nodes.

Figure 15:
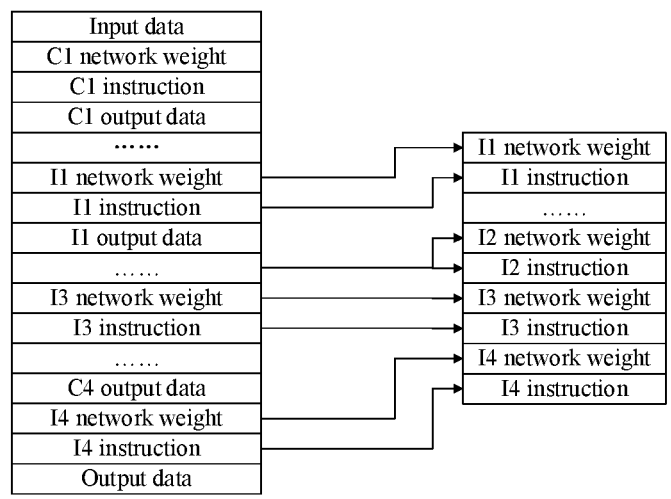
FIG. 15 is a schematic diagram of generation of a first offline model of the neural network according to FIG. 14.

Finally, the first processor may store, in the first nonvolatile memory, the network weights and the instructions corresponding to the respective compute nodes having the first operational attribute in the original neural network to generate the first offline model, the storage of which is shown in the memory space of the right part of FIG. 15. Moreover, the first offline model may only include data like network weights and instructions that are necessary for running the compute nodes having the first operational attribute in the original neural network without storing input data, output data or intermediate computation result during running of the original neural network.

Therefore, the consumption of memory space may be reduced.

Optionally, the method may further include:

according to the connections among the plurality of compute nodes in the original neural network, making all of first compute nodes among more than two second compute nodes, which are executed in order, equivalent to a first offline node (First Offline1) to acquire an equivalent network corresponding to the original neural network as shown in FIG. 14. The first compute node may be a compute node having the first operational attribute, and the second compute node may be a compute node having the second operational attribute. The first offline model may further include interface data between the first offline node (First Offline1) and the second compute node. The interface data may be configured to represent connections among the first offline node (First Offline1) and other second compute nodes, and may include input data sources and output data sources of the respective first offline nodes.

More specifically, as shown in FIG. 14, all of compute nodes having the first operational attribute between two adjacent compute nodes having the CPU operational attribute may be made equivalent to a first offline node (First Offline1) so that an equivalent network of the original neural network may be acquired. Optionally, since the first offline node is an equivalent node of a plurality of compute nodes having the first operational attribute, the operational attribute of the first offline node (First Offline1) is the first operational attribute. Further, the connection between the first offline node (First Offline1) and the second compute node having the second operational attribute in the original neural network may be determined according to the input or output data. For instance, as shown in FIG. 14, the network weights and the connections among the first offline node (First Offline1) and the second compute nodes C1, C2 and C3 may be determined according to the input data of the first offline node (First Offline1), and the network weight and the connection between the first offline node (First Offline1) and the second offline node (Second Offline1) may be determined according to the output data of the first offline node (First Offline1). Further, the interface data may include the input data of the first offline node (First Offline1) as output data of the compute nodes C1, C2 and C3, and the output data of the first offline node as input data of the second compute nodes C4 and C5.

As a further improvement, the offline model of the original neural network may further include network weights and instructions corresponding to the compute nodes having the second operational attribute in the original neural network. As shown in FIG. 11, the method may further include:

if the operational attribute of the current compute node is the second operational attribute, storing the network weight and the instruction corresponding to the current compute node in a second nonvolatile memory to acquire the second offline model corresponding to the original neural network. In other words, during the running of the original neural network, the network weights and the instructions corresponding to the respective compute nodes having the second operational attribute may be stored in the second nonvolatile memory (such as the second memory). The network weights and instructions corresponding to the plurality of compute nodes having the second operational attribute may form a second offline model unit of the original neural network. In this way, when it is required to run the original neural network again, instructions, such as computational attribute of the respective compute nodes having the second operational attribute in the original neural network, and corresponding network weights may be acquired directly from the second nonvolatile memory. Specifically, the step S730 may further include:

S734: acquiring the network weights and the instructions corresponding to the respective compute nodes having the second operational attribute in the original neural network from the first memory, and storing the network weights corresponding to the respective compute nodes having the second operational attribute in the original neural network in the second nonvolatile memory to generate the second offline model. The generation of the second offline model may be seen in FIG. 16, where the second offline model is stored in the memory space in the left part of FIG. 16.

The first offline model stored in the first nonvolatile memory and the second offline model stored in the second nonvolatile memory form an offline model of the original neural network. Consequently, when it is required to execute the offline model again, the network weights and instructions corresponding to the compute nodes having the first operational attribute may be acquired from the first nonvolatile memory, and the network weights and instructions corresponding to the compute nodes having the second operational attribute may be acquired from the second nonvolatile memory. Therefore, the original neural network may be executed directly without compiling the original neural network again.

Further, the first processor may make all of the second compute nodes among more than two first compute nodes, which are executed in order, equivalent to a second offline node. The first compute nodes are compute nodes having the first operational attribute, and the second compute nodes are compute nodes having the second operational attribute. The second offline model may further include interface data among the second offline node and the first compute nodes.

Figure 16:
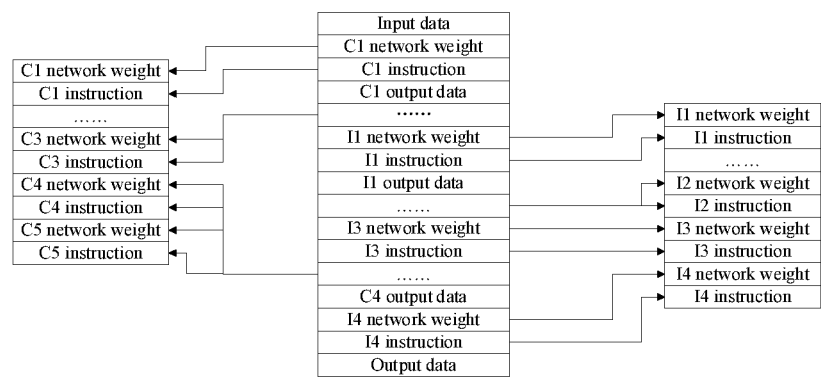
FIG. 16 is a schematic diagram of generation of the first offline model and a second offline model of the neural network according to FIG. 14.

Referring to FIG. 14 and FIG. 16, generation of the offline model will be explained as follows.

Firstly, the first processor may acquire the model dataset, the model structure parameters, and the input data of the original neural network so as to acquire the diagram of network structure of the original neural network as shown in FIG. 14 according to the model dataset and the model structure parameters of the original neural network. Moreover, the first processor may acquire operational attributes of the respective compute nodes in the original neural network.

Secondly, the first processor may acquire the connections among the respective compute nodes of the original neural network according to the model structure parameters of the original neural network, acquire the order of execution of the respective compute nodes in the original neural network according to the connections among the respective compute nodes, and acquire the memory allocation manner during the running of the original neural network so as to acquire the position where the related data is stored during running of the original neural network. As shown in the memory space of the middle part of FIG. 16, the related data during running of the original neural network may be stored in a stack according to the order of execution of the respective compute nodes.

Finally, the first processor may store, in the first nonvolatile memory, the network weights and the instructions corresponding to the respective compute nodes having the first operational attribute in the original neural network to generate the first offline model, the storage of which is shown in the memory space of the right part of FIG. 16. In addition, the first processor may also store the network weights and the instructions corresponding to the respective compute nodes having the second operational attribute in the original neural network in the second nonvolatile memory to generate the second offline model, the storage of which is shown in the memory space of the left part of FIG. 16. Moreover, the first offline model and the second offline model may only include data like network weights and instructions that are necessary for running the original neural network without storing input data, output data or intermediate computation result during running of the original neural network. Therefore, the consumption of memory space may be reduced.

Further, the general purpose processor may include one or more of a central processing unit (CPU), a graphics processing unit (GPU), a digital signal processor (DSP), and a field programmable gate array (FPGA). The second operational attribute may include one or more of a CPU operational attribute, a GPU operational attribute, a DSP operational attribute, and an FPGA attribute. For instance, if the computer system includes the first processor (such as a CPU) and a second processor (such as an IPU), the operational attribute of the compute node may be the CPU operational attribute, the first operational attribute, or combination of them. In the case where the operational attribute of the compute node is the CPU operational attribute, the computation instruction corresponding to the compute node may need to be executed on the first processor (such as a CPU). In the case where the operational attribute of the compute node is the first operational attribute, the computation instruction corresponding to the compute node may need to be executed on the second processor. In the case where the operational attribute of the compute node is combination of the CPU operational attribute and the first operational attribute, the computation instruction corresponding to the compute node may be executed on the first processor and may also be executed on the second processor. In this case, the operational attribute of the compute node may be marked as first operational attribute. Furthermore, the operational attributes of the respective compute nodes may be marked and stored by enumeration. For instance, the enumeration variable may include more than two enumeration values. If the operational attribute of the current compute node is the first operational attribute, an enumeration value of the enumeration variable may be 1; if operational attribute of the current compute node is the second operational attribute, the enumeration value of the enumeration variable may be 0.

For another example, in the case where the computer system includes a first processor (such as a CPU) and two second processors including a second processor 1 (such as a GPU) and a second processor 2 (such as an IPU), the operational attribute of a compute node may be combination of one or more of the CPU operational attribute, the GPU operational attribute, or the first operational attribute. In the case where the operational attribute of the compute node is the CPU operational attribute, the computation instruction corresponding to the compute node may need to be executed on the first processor (such as CPU). In the case where the operational attribute of the compute node is the GPU operational attribute, the computation instruction corresponding to the compute node may need to be executed on the second processor 1 (such as GPU). In the case where the operational attribute of the compute node is the first operational attribute, the computation instruction corresponding to the compute node may need to be executed on the second processor 2 (such as an IPU). In the case where the operational attribute of the compute node is a combination of the CPU operational attribute and the first operational attribute, the computation instruction corresponding to the compute node may be executed on the first processor and may also be executed on the second processor 2 (IPU). In this case, the operational attribute of the compute node may be marked as the first operational attribute. Further, the enumeration variable may have three enumeration values. For instance, if the operational attribute of the current compute node is the first operational attribute, the enumeration value of the enumeration variable may be 1; if the operational attribute of the current compute node is the CPU operational attribute, the enumeration value of the enumeration variable may be 0; and if the operational attribute of the current compute node is the GPU operational attribute, the enumeration value of the enumeration variable may be 2. The operational attribute of the current compute node may be learnt from the value of the enumeration variable.

Further, the second offline model may include a plurality of second offline sub-models. For instance, one of the second offline sub-models may include instructions and network weights corresponding to all of the compute nodes having the CPU operational attribute, one of the second offline sub-models may include instructions and network weights corresponding to all of the compute nodes having the GPU operational attribute, one of the second offline sub-models may include instructions and network weights corresponding to all of the compute nodes having the DSP operational attribute, etc.

Figure 13:
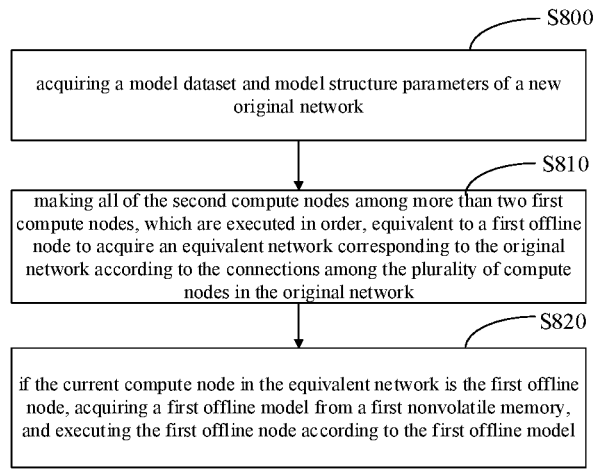
FIG. 13 is a flow chart of a neural network processing method according to an example.

In an example, after an offline model is generated, an operation may be executed immediately using the offline model, or the offline model may be stored for use in computation as needed. As shown in FIG. 13, an example of the disclosure further provides a neural network processing method, including:

S800: acquiring a model dataset and model structure parameters of an original neural network. The model dataset may include network weights corresponding to the respective compute nodes in the original neural network, and the model structure parameters may include connections among a plurality of compute nodes in the original neural network. The detailed execution may be seen in the step S700, which is be omitted here.

S810: according to the connections among the plurality of compute nodes in the original neural network, making all of the first compute nodes among more than two first compute nodes, which are executed in order, equivalent to a first offline node to acquire an equivalent network corresponding to the original neural network. The first compute nodes may be compute nodes having a first operational attribute, and the second compute nodes may be compute nodes having a second operational attribute. Further, order of execution of the respective compute nodes in the equivalent network corresponding to the original neural network may be acquired.

For instance, as shown in FIG. 14, all of compute nodes having the first operational attribute between two adjacent compute nodes having a CPU operational attribute, may be made equivalent to a first offline node (First Offline1) to acquire an equivalent network corresponding to the original neural network according to the connections among the plurality of compute nodes in the original neural network. Optionally, since the first offline model is an equivalent node of a plurality of compute nodes having the first operational attribute, the operational attribute of the first offline node (First Offline1) may be the first operational attribute. Further, the connection between the first offline node (First Offline1) and the second compute node having the second operational attribute in the original neural network may be determined according to input or output data. The order of execution of the respective compute nodes in the equivalent network corresponding to the original neural network may be C1-C2-C3-First Offline1-C4-C5-First Offline2. The second compute nodes C1, C2 and C3 may be executed concurrently, and compute C4 and C5 may be executed concurrently. Therefore, the processing efficiency of the computer system may be increased.

S820: if a current compute node in the equivalent network is the first offline node, acquiring a first offline model from a first nonvolatile memory, and executing the first offline node according to the first offline model. The first offline model may include network weights and instructions corresponding to all of the first compute nodes having the first operational attribute in the original neural network. Specifically, if a current compute node is the first offline node, a first acquisition unit of a first processor may acquire a network weight and an instruction corresponding to a compute node having the first operational attribute from the first offline model according to the order of execution of the respective compute nodes in the equivalent network corresponding to the original neural network.

As shown in FIG. 14, when the original neural network is run again, if the current compute node is the first offline node First Offline1, according to the equivalent network corresponding to the original neural network, the network weights and the instructions corresponding to the respective first compute nodes in the first offline node First Offline1 may be acquired from the first nonvolatile memory without compiling the instructions of the respective first compute nodes in the first offline node First Offline1. Therefore, the processing efficiency of the first processor may be increased. When running of the first offline node is finished, the first processor may continue to execute the second compute nodes C4 and C5 according to a structure of the equivalent network corresponding to the original neural network. After that, the first processor may acquire the network weights and the instructions corresponding to the respective first compute nodes in the first offline node First Offline2 from the first nonvolatile memory according to the structure of the equivalent network corresponding to the original neural network. Therefore, it is not necessary to compile the instructions of the respective first compute nodes in the first offline node First Offline2.

Further, the first offline model may further include interface data among the first offline nodes and the second compute nodes. Specifically, the first offline model may further include interface data among the respective first offline nodes and the second compute nodes connected to the respective first offline nodes. For instance, the interface data may include input data of the first offline node First Offline1 as output data of the second compute nodes C1~C3, and output data of the first offline node First Offline1 as input data of the second compute nodes C4 and C5.

In this case, when the original neural network is run again, if the current compute node is the first offline node First Offline1 according to the equivalent network corresponding to the original neural network, the network weights and the instructions corresponding to the respective first compute nodes in the first offline node First Offline1 may be acquired from the first nonvolatile memory. Therefore, it is not necessary to compile the instructions of the respective first compute nodes in the first offline node First Offline1. The processing efficiency of the first processor may be therefore increased. Meanwhile, the first processor may execute the second compute nodes C4 and C5 after determining that the execution of the first offline node First Offline1 is finished according to the interface data between the first offline node First Offline1 and the second compute node connected to the first offline node First Offline1 in the first offline model. After the execution of the second compute nodes C4 and C5 is finished, the first processor may acquire the network weights and the instructions corresponding to the respective first compute nodes in the first offline node First Offline2 from the first nonvolatile memory according to the equivalent network corresponding to original neural network. Therefore, it is not necessary to compile the instructions of the respective first compute nodes in the first offline node First Offline2.

It is comprehensible that the first offline model may include instructions and weights corresponding to a plurality of first offline nodes. Order of execution of the plurality of first offline nodes may be determined according to the equivalent network corresponding to the original neural network, and each of the first offline nodes may be labelled according to its order of execution. When it is required to acquire a network weight and an instruction corresponding to a first offline node from the first offline model, the network weight and the instruction may be looked up merely according to the label of the first offline node. Of course, the network weight and the instruction corresponding to the first offline node may be read directly according to a memory address of each of the first offline nodes, thus realizing an accurate search.

Furthermore, the offline model of the original neural network may include network weights and instructions corresponding to other second compute nodes having the second operational attribute in the original neural network. The method may further include:

if the current compute node in the equivalent network is not the first offline node, acquiring a second offline model from a second nonvolatile memory, and executing the current compute node in the equivalent network according to the second offline model. Specifically, the first processor may make all of the second compute nodes among more than two first compute nodes, which are executed in order, equivalent to a second offline node according to connections among a plurality of compute nodes in the original neural network. The first compute nodes may be compute nodes having the first operational attribute, and the second compute nodes may be compute nodes having the second operational attribute. The second offline model may further include interface data among the second offline node and the first compute nodes.

In this case, when the original neural network is run again, if the current compute node is the first offline node First Offline1 according to the equivalent network corresponding to the original neural network, the network weights and the instructions corresponding to the respective first compute nodes in the first offline node First Offline1 may be acquired from the first nonvolatile memory. Therefore, it is not necessary to compile the instructions of the respective first compute nodes in the first offline node First Offline1. The processing efficiency of the first processor may be therefore increased. Meanwhile, the first processor may execute second compute nodes C4 and C5 after determining that the execution of the first offline node First Offline1 is finished according to the interface data between the first offline node First Offline1 and the second compute node connected to the first offline node First Offline1 in the first offline model. After that, the first processor may acquire a network weight and an instruction corresponding to the second compute node C4, and a network weight and an instruction corresponding to the second compute node C5, and execute the compute nodes C4 and C5 according to the second offline model corresponding to the second offline node Second Offline1. Meanwhile, the first processor may execute first offline node First Offline2 after the execution of the second offline node Second Offline1 is finished according to the interface data between the second offline node Second Offline1 and the first compute node connected to the second offline node Second Offline1 in the second offline model. After the execution of the second offline node Second Offline1 is finished, the first processor may acquire network weights and instructions corresponding to the respective first compute nodes in the first offline node First Offline2 from the first nonvolatile memory. Therefore, it is not necessary to compile instructions of the respective first compute nodes in the first offline node First Offline2.

It is comprehensible that the second offline model may include instructions and weights corresponding to a plurality of second offline nodes. Order of execution of the plurality of second offline nodes may be determined according to the equivalent network corresponding to the original neural network, and each of the second offline node may be labelled according to its order of execution. When it is required to acquire a network weight and an instruction corresponding to a second offline node from the second offline model, the network weight and the instruction may be looked up according to the label of the second offline node. Of course, the network weight and the instruction corresponding to the second offline node may be read directly according to a memory address of each of the first offline nodes, thus realizing an accurate search.

As a further improvement, the second offline model may include a plurality of second offline sub-models. For instance, one of the second offline sub-models may include instructions and network weights corresponding to compute nodes having a CPU operational attribute, one of the second offline sub-models may include instructions and network weights corresponding to compute nodes having a GPU operational attribute, one of the second offline sub-models may include instructions and network weights corresponding to compute nodes having a DSP operational attribute, etc. In this case, when it is required to run the original neural network again, if a current compute node is a first offline node having the first operational attribute according to the equivalent network corresponding to the original neural network, the first processor may acquire network weights and instructions corresponding to the respective first compute nodes in the first offline node from the first nonvolatile memory, and execute the first offline node directly. If the current compute node is a compute node having the CPU operational attribute, a network weight and an instruction corresponding to the current compute node may be acquired from the second offline sub-model corresponding to the current compute node, and the current compute node may be executed directly. If the current compute node is a compute node having the GPU operational attribute, a network weight and an instruction corresponding to the current compute node may be acquired from the second offline sub-model corresponding to the current compute node, and the current compute node may be executed directly. If the current compute node is a compute node having the DSP operational attribute, a network weight and an instruction corresponding to the current compute node may be acquired from the second offline sub-model corresponding to the current compute node, and the current compute node may be executed directly.

One of ordinary skill in the art can understand that the entire or part of the flow in the methods as stated in the examples can be carried out by instructing related hardware by a computer program which may be stored in a computer readable storage medium. When the program is executed, it may include the flow of each of the method as stated in the examples. Any reference, which is used in the examples provided in the present disclosure, to the memory, storage, database, or any other medium may include a nonvolatile and/or volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration but not limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESRAM), a synchlink DRAM (SLDRAM), a Rambus direct RAM (RDRAM), a direct Rambus dynamic RAM (DRDRAM), and a Rambus dynamic RAM (RDRAM), etc.

Moreover, the present disclosure further provides a computer system 300, which includes a first processor 310, a first memory 320 and a second memory 330 corresponding to the first processor 310, one or more second processors 340, and one or more third memories 350 corresponding to the second processors 340. Each of the second processor 340 may be connected to the first processor 310, and the first memory 320 or the second memory 330 may store a computer program. When the first processor 310 executes the computer program, the method as stated in any one of the examples may be executed. Specifically, when the first processor 310 executes the computer program, the following steps may be implemented:

acquiring a model dataset and model structure parameters of an original neural network, where the model dataset may include network weights corresponding to respective compute nodes in the original neural network, and the model structure parameters may include connections among a plurality of compute nodes in the original neural network.

acquiring operational attributes of the respective compute nodes in the original neural network, where the operational attributes of the respective compute nodes may include a first operational attribute and a second operational attribute. Specifically, a first acquisition unit or a first operation unit of the processor may acquire operational attributes of the respective compute nodes in the original neural network. An operational attribute of a compute node may be configured to mark which processor the computation instruction corresponding to the compute node is executed on. In this example, the first operational attribute may be configured to represent that the computation instruction corresponding to the compute node may be executed on an application specific neural network processor, such as an IPU, and the a second operational attribute may be configured to represent that the computation instruction corresponding to the compute node may be executed on a general purpose processor, such as a CPU, a GPU, or a DSP.

Further, the operational attributes of the respective compute nodes may be represented and stored by enumerating.

For instance, an enumeration variable device may be defined. The enumeration variable may include more than two enumeration values. If an operational attribute of a current compute node is the first operational attribute, an enumeration value of the enumeration variable may be 1; if the operational attribute of the current compute node is the second operational attribute, the enumeration value of the enumeration variable may be 0.

running the original neural network according to the model dataset, the model structure parameters, and the operational attributes of the respective compute nodes to acquire instructions corresponding to the respective compute nodes in the original neural network. Further, the first acquisition unit of the first processor may obtain input data of the original neural network, the first operation unit of the first processor may run the original neural network according to the input data, the network model dataset, the model structure parameters, and the operational attributes of the respective compute nodes to acquire instructions corresponding to the respective compute nodes in the original neural network. Furthermore, the process of running the original neural network to acquire the instructions corresponding to the respective compute nodes is substantially a process of compiling, which may be implemented by a processor or a virtual device of the computer system. In other words, the processor or the virtual device of the computer system may run the original neural network according to the model dataset and the model structure parameters of the original neural network. The virtual device may refer to a processor running space virtualized in the memory space of the memory.

It should be clear that running of the original neural network in this example means that the processor may run a machine learning algorithm (such as a neural network algorithm) using artificial neural network model data and implement a target application of the algorithm (such as an artificial intelligence application, like speech recognition) by executing forward operation.

If the operational attribute of the current compute node is the first operational attribute, storing the network weight and the instruction corresponding to the current compute node in a first nonvolatile memory to acquire a first offline model corresponding to the original neural network. The first nonvolatile memory may be a third memory corresponding to the application specific neural network processor, such as an IPU. Further, for every compute node of the original neural network, the network weight and the instruction of the compute node may be stored in one-to-one correspondence. In this way, when the original neural network is run again, the first offline model corresponding to the original neural network may be acquired from the first nonvolatile memory directly, and all of the compute nodes having the first operational attribute in the original neural network may be run according to the first offline model without acquiring instructions by compiling online the compute nodes having the first operational attribute in the original neural network. Therefore, the running speed and efficiency of the system may be increased.

It should be clear that in this example, directly running the first offline model corresponding to the original neural network means that a machine learning algorithm (such as a neural network algorithm) corresponding to the original neural network may be run using the first offline model, and a target application of the algorithm (such as an artificial intelligence application, like speech recognition) may be implemented by executing forward operation.

Further, the computer system may be the computer system shown in FIG. 9, and the first processor of the computer system may be a central processing unit (CPU), a graphics processing unit (GPU), a digital signal processor (DSP), a field programmable gate array (FPGA), or the like. The second processor may be an application specific neural network processor, a central processing unit (CPU), a graphics processing unit (GPU), a digital signal processor (DSP), a field programmable gate array (FPGA), or the like. It is comprehensible that the operating principle of the computer system in this example is basically consistent with the implementation of the steps of the neural network processing method shown in FIG. 10~FIG. 13, which is seen in the above text and therefore is omitted here.

In addition, an example of the present disclosure further provides a computer storage medium, in which a computer program is stored. When the computer program is executed by one or more processors, the method as stated in any of the above-mentioned examples may be executed. The computer storage medium may include a nonvolatile and/or volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), or an external cache memory. By way of illustration but not limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESRAM), a synchlink DRAM (SLDRAM), a Rambus direct RAM (RDRAM), a direct Rambus dynamic RAM (DRDRAM), a Rambus dynamic RAM (RDRAM), etc.

The neural network processing method, the computer system, and the storage medium of the present disclosure may acquire the first offline model corresponding to the original neural network by storing an instruction and a network weight corresponding to a compute node having the first operational attribute during running of the original neural network. When the original neural network is run again, the instruction and the network weight corresponding to the compute node having the first operational attribute may be acquired from the first offline model corresponding to the original neural network without compiling related data (such as model dataset and model structure parameters) corresponding to the compute node having the first operational attribute in the original neural network again. Therefore, time for running the same network by a processor may be reduced, and processing speed and efficiency of the processor is increased.

The technical features in the above-mentioned examples may be combined randomly. For a brief description, not every possible combination of the technical features in the above-mentioned examples is described. However, combinations of these technical features shall be considered within the range of the description as long as they do not contradict to each other.

The above-mentioned examples are merely some examples of the present disclosure. The invention is described in a detailed way. Nonetheless, it should not be considered that this limits the scope of protection claimed by the present disclosure. It should be indicated that one of ordinary skill in the art may make some variations and improvements within the idea of the disclosure, and these variations and improvements are within the scope of protection claimed by the present disclosure. Therefore, the scope of protection claimed by the present disclosure shall be subject to the attached claims.

What is claimed is:

1. A neural network processing method, comprising:
acquiring, by an acquisition unit, a model dataset and model structure parameters of an original neural network,
wherein the model dataset includes network weights corresponding to respective compute nodes of a plurality of compute nodes in the original neural network, and
wherein the model structure parameters include connection values that indicate connections among the plurality of compute nodes in the original neural network;
acquiring, by an operation unit, operational attributes of the respective compute nodes of the plurality of compute nodes in the original neural network,
wherein the operational attributes of the respective compute nodes of the plurality of compute nodes includes a first operational attribute that indicates that instructions corresponding to the plurality of compute nodes are executable on an application specific neural network processor, and a second operational attribute that indicates that the instructions corresponding to the plurality of compute nodes are executable on a general purpose processor,
wherein the application specific neural network processor serves as a coprocessor communicating with the general purpose processor, and
wherein the application specific neural network processor serves as a coprocessor communicating with the general purpose processor;
running, by the operation unit, the original neural network to acquire the instructions that are executable by the application specific neural network processor corresponding to the respective compute nodes of the plurality of compute nodes in the original neural network, according to the model dataset, the model structure parameters, and the operational attributes of the respective compute nodes;
determining, by a control unit, that an operational attribute of a current compute node of the plurality of compute nodes is the first operational attribute; and
based on the determination, storing, by the control unit, network weight and one of the instructions that are executable by the application specific neural network processor without further compilation in a first nonvolatile memory, to generate a first offline model corresponding to the original neural network, wherein,
the instructions are executable by the application specific neural network processor without further compilation,
the stored instruction and network weight correspond to the current compute node,
the first offline model is to be run by the application specific neural network processor without compiling the original neural network,
the storing of the network weight and one of the instructions for the generation of the first offline model corresponding to the original neural network includes:
acquiring a memory allocation manner of the original neural network according to the model dataset and the model structure parameters of the original neural network;
storing related data during running of the original neural network in a volatile memory according to the memory allocation manner, wherein the related data during the running of the original neural network includes the network weights, the instructions, input data, and output data corresponding to the respective compute nodes of the original neural network;
acquiring the network weights and instructions corresponding to the respective compute nodes of the plurality of computing nodes having the first operational attribute in the original neural network from the volatile memory;
storing, in the first nonvolatile memory, the network weights and the instructions corresponding to the respective compute nodes of the plurality of computing nodes having the first operational attribute in the original neural network to generate the first offline model;
acquiring, the network weights and the instructions corresponding to the respective compute nodes of the plurality of computing nodes having the second operational attribute in the original neural network from the volatile memory; and
storing, in a second nonvolatile memory, the network weights corresponding to the respective compute nodes of the plurality of computing nodes having the second operational attribute in the original neural network to generate a second offline model.

2. The method of claim 1, wherein the acquisition of the operational attributes of the respective compute nodes of the plurality of compute nodes in the original neural network includes:
determining that the respective compute nodes are executable on the application specific neural network processor, based on the determination that the current compute node is executable on the application specific neural network processor, and
marking the current compute node with the first operational attribute, and based on the determination that the current compute node is executable on the general purpose processor only, marking the current compute node with the second operational attribute.

3. The method of claim 2, the determination of whether the respective compute nodes of the plurality of compute nodes are executable on the application specific neural network processor includes:
searching whether the current compute node has an equivalent compute node via a preset function table, wherein the equivalent compute node being a compute node that is executable on the application specific neural network processor,
based on the determination that the current compute node has the equivalent compute node, determining that the current compute node is executable on the application specific neural network processor, and
based on the determination that the current compute node does not have the equivalent compute node, determining that the current compute node is executable merely on the general purpose processor.

4. The method of claim 2, wherein the general purpose processor includes one or more of a central processing unit (CPU), a graphics processing unit (GPU), a digital signal processor (DSP), and a field programmable gate array (FGPA), and the second operational attribute includes one or more of a CPU operational attribute, a GPU operational attribute, a DSP operational attribute, and an FGPA attribute.

5. The method of claim 1, wherein the acquisition of the operational attributes of the respective compute nodes of the plurality of compute nodes in the original network includes acquiring the operational attributes of the respective compute nodes of the plurality of compute nodes in the original network from the model dataset or the model structure parameters of the original network.

6. The method of claim 1, further comprising:
making all first compute nodes among the plurality of compute nodes more than two second compute nodes of the plurality of compute nodes, which are executed in order, equivalent to a first offline node, wherein
the first compute nodes are compute nodes having the first operational attribute,
the two second compute nodes of the plurality of compute nodes are compute nodes having the second operational attribute, and
the first offline model further includes interface data among the first offline nodes and the more than two second compute nodes.

7. The method of claim 1, further comprising:
if the operational attribute of the current compute node is the second operational attribute, storing the network weight and the instruction corresponding to a current compute node of the plurality of compute nodes in the second nonvolatile memory to acquire a second offline model corresponding to the original neural network;
wherein the second offline model can include a plurality of second offline sub-models; and
wherein the second offline sub-models include instructions and network weights corresponding to compute nodes having a CPU operational attribute, a GPU operational attribute, or a DSP operational attribute.

8. The method of claim 7, further comprising:
making all of second compute nodes among the plurality of compute modes more than two of first compute nodes of the plurality of compute modes, which are executed in order, equivalent to a second offline node, wherein
the first compute nodes are compute nodes having the first operational attribute,
the second compute nodes are compute nodes having the second operational attribute, and
the second offline model further includes interface data among the second offline nodes and the first computer nodes.

9. The method of claim 1, while running the original neural network to acquire the instructions corresponding to the respective compute nodes in the original neural network according to the model dataset, the model structure parameters, and the operational attributes of the respective compute node includes:
acquiring order of execution of the respective compute nodes in the original neural network according to the model structure parameter of the original neural network;
acquiring target processors corresponding to the respective compute nodes according to the operational attributes of the respective compute nodes; and
executing the respective compute nodes via the target processors corresponding to the respective compute nodes, according to the order of execution of the respective compute nodes in the original neural network, to acquire the instructions corresponding to the respective compute nodes in the original neural network.

10. A neural network processing method, comprising:
acquiring, by an acquisition unit, a model dataset and model structure parameters of an original neural network, wherein
the model dataset comprising network weights corresponding to respective compute nodes of a plurality of compute nodes in the original neural network, and
the model structure parameters comprising connections among the plurality of compute nodes in the original network;
making all of first compute nodes among the plurality of compute nodes more than two second compute nodes of the plurality of compute nodes, which are executed in order, equivalent to a first offline node to acquire an equivalent network corresponding to the original network according to the connections among the plurality of compute nodes in the original network, wherein
the first compute nodes being compute nodes having a first operational attribute,
the second compute nodes being compute nodes having a second operational attribute,
the first operational attribute indicates instructions corresponding to the plurality of compute nodes are executable on an application specific neural network processor, and
the second operational attribute that indicates that the instructions corresponding to the plurality of compute nodes are executable on a general purpose processor;
storing, by a control unit, the network weights and one of instructions that are executable by the application specific neural network processor without further compilation in a first nonvolatile memory, to generate a first offline model corresponding to the original neural network, wherein the storing of the network weights and one of the instructions for the generation of the first offline model corresponding to the original neural network includes:
acquiring a memory allocation manner of the original neural network according to the model dataset and the model structure parameters of the original neural network;
storing related data during running of the original neural network in a volatile memory according to the memory allocation manner, wherein the related data during the running of the original neural network includes the network weights, the instructions, input data, and output data corresponding to the respective compute nodes of the original neural network;
acquiring the network weights and instructions corresponding to the respective compute node of the plurality of computing nodes having the first operational attribute in the original neural network from the volatile memory;
storing, in the first nonvolatile memory, the network weights and the instructions corresponding to the respective compute nodes of the plurality of computing nodes having the first operational attribute in the original neural network to generate the first offline model;
acquiring, the network weights and the instructions corresponding to the respective compute nodes of the plurality of computing nodes having the second operational attribute in the original neural network from the volatile memory; and storing, in a second nonvolatile memory, the network weights corresponding to the respective compute nodes of the plurality of computing nodes having the second operational attribute in the original neural network to generate a second offline model;

if a current compute node in the equivalent network is a first offline node, acquiring, by the acquisition unit, the first offline model from the first nonvolatile memory; and executing, by an operation unit, the first offline node according to the first offline model, wherein the first offline model comprises network weights and the instructions that are executable on the application specific neural network processor without further compilation corresponding to all of the first compute nodes in the original neural network, wherein the first offline model is run by an application specific neural network processor without compiling the original neural network, and the instructions indicate kinds of computation operation to be executed by the respective compute node of the plurality of compute nodes.

11. The method of claim 10, wherein the first offline model further includes interface data among the first offline node and the second compute nodes.

12. The method of claim 10, further comprising: if the current compute node in the equivalent network is not the first offline node, acquiring a second offline model from the second nonvolatile memory, and executing the current compute node in the equivalent network according to the second offline model.

13. A neural network processing method, comprising:
acquiring, by an acquisition unit, a model dataset and model structure parameters of an original neural network, wherein
the model dataset comprises network weights corresponding to respective compute nodes of a plurality of compute nodes in the original neural network, and
the model structure parameters comprise connections among the plurality of compute nodes and computational attributes of the respective compute nodes of the plurality of compute nodes s in the original neural network;

acquiring, by an operation unit, operational attributes of the respective compute nodes of the plurality of compute nodes in the original neural network,
wherein the operational attributes of the respective compute nodes of a plurality of compute nodes include a first operational attribute that indicates that instructions corresponding to the plurality of compute nodes executable on an application specific neural network processor, and a second operational attribute that indicates that the instructions corresponding to the compute nodes can only be executed on a general purpose processor,
wherein the application specific neural network processor serves as a coprocessor communicating with the general purpose processor;

running, by the operation unit, the original neural network according to the model dataset and the model structure parameters of the original neural network to acquire instructions that are executable by the application specific neural network processor without further compilation corresponding to the respective compute nodes of a plurality of compute nodes in the original neural network; and generating, by a control unit, a first offline model corresponding to the original neural network according to the network weights and the instructions that are executable on the application specific neural network processor without further compilation corresponding to the respective compute nodes of the original neural network, wherein
the generating of the first offline model corresponding to the original neural network according to the network weights and the instructions corresponding to the respective compute nodes of the plurality of computing nodes of the original neural network includes:
acquiring a memory allocation manner of the original neural network according to the model dataset and the model structure parameters of the original neural network;
storing related data during running of the original neural network in a volatile memory according to the memory allocation manner, wherein the related data during the running of the original neural network includes the network weights, the instructions, input data, and output data corresponding to the respective compute nodes of the original neural network;
acquiring the network weights and instructions corresponding to the respective compute nodes of the plurality of computing nodes having the first operational attribute in the original neural network from the volatile memory; and
storing, in the first nonvolatile memory, the network weights and the instructions corresponding to the respective compute nodes of the plurality of computing nodes having the first operational attribute in the original neural network to generate the first offline model; and
storing, the first nonvolatile memory, the network weights and the instructions corresponding to the respective compute nodes of the plurality of computing nodes having the first operational attribute in the original neural network to generate the first offline model, wherein the offline model is executable by the application specific neural network processor without compiling the original neural network;
acquiring, the network weights and the instructions corresponding to the respective compute nodes of the plurality of computing nodes having the second operational attribute in the original neural network from the volatile memory; and
storing, in a second nonvolatile memory, the network weights corresponding to the respective compute nodes of the plurality of computing nodes having the second operational attribute in the original neural network to generate a second offline model.

14. The method of claim 13, wherein running the original neural network according to the model dataset and the model structure parameters of the original neural network to acquire the instructions corresponding to the respective compute nodes in the original neural network includes:
acquiring, by the acquisition unit, order of execution of the respective compute nodes in the original neural network according to the model structure parameters of the original neural network, and
running, by the operation unit, the original neural network according to the order of execution of the respective compute node sin the original neural network to acquire the instructions corresponding to the respective compute nodes in the original neural network.

15. The method of claim 13, wherein the first offline model further includes node interface data which is configured to represent connections among the compute nodes of the original neural network.

16. The method of claim 13, wherein
running the original neural network according to the model dataset and the model structure parameters of the original neural network includes:
running, by a processor or a virtual device of a computer system, the original neural network according to the model dataset and the model structure parameters of the original neural network.

17. The method of claim 13, further comprising:
acquiring a model dataset and model structure parameters of a new original neural network;
if the new original neural network has a corresponding offline model, acquiring the offline model corresponding to the new original neural network from the nonvolatile memory, and
running the new original neural network according to the offline model corresponding to the new original neural network; and
if the new original neural network does not have a corresponding offline model, running the new original neural network according to the model dataset and the model structure parameters of the new original neural network,
generating and storing an offline model corresponding to the new original neural network in the nonvolatile memory.

18. A neural network processing method, comprising:
acquiring, by an acquisition unit, model structure parameters of an original neural network, wherein the model structure parameters comprise connections among a plurality of compute nodes in the original neural network;
acquiring, by the acquisition unit, an offline model corresponding to the original neural network from a nonvolatile memory, wherein the offline model corresponding to the original neural network comprises network weights and instructions that are executable on an application specific neural network processor without further compilation corresponding to the respective compute nodes of the original neural network;
acquiring, by an operation unit, operational attributes of the respective compute nodes of the plurality of compute nodes in the original neural network,
wherein the operational attributes of the respective compute nodes include a first operational attribute that indicates that instructions corresponding to the compute nodes executable on the application specific neural network processor, and a second operational attribute that indicates that the instructions corresponding to the compute nodes can executable on a general purpose processor, wherein the application specific neural network processor serves as a coprocessor communicating with the general purpose processor;
determining, by a control unit, that an operational attribute of a current compute node of the plurality of compute nodes is the first operational attribute; and
based on the determination, storing, by the control unit, network weight and one of the instructions that are executable by the application specific neural network processor without further compilation in a first nonvolatile memory, to generate a first offline model corresponding to the original neural network, wherein,
the instructions are executable by the application specific neural network processor without further compilation,
the stored instruction and network weight correspond to the current compute node,
the first offline model is to be run by the application specific neural network processor without compiling the original neural network,
the storing of the network weight and one of the instructions for the generation of the first offline model corresponding to the original neural network includes:
acquiring a memory allocation manner of the original neural network according to the model dataset and the model structure parameters of the original neural network;
storing related data during running of the original neural network in a volatile memory according to the memory allocation manner, wherein the related data during the running of the original neural network includes the network weights, the instructions, input data, and output data corresponding to the respective compute nodes of the original neural network;
acquiring the network weights and instructions corresponding to the respective compute nodes of the plurality of computing nodes having the first operational attribute in the original neural network from the volatile memory;
storing, in the first nonvolatile memory, the network weights and the instructions corresponding to the respective compute nodes of the plurality of computing nodes having the first operational attribute in the original neural network to generate the first offline model;
acquiring, the network weights and the instructions corresponding to the respective compute nodes of the plurality of computing nodes having the second operational attribute in the original neural network from the volatile memory; and
storing, in a second nonvolatile memory, the network weights corresponding to the respective compute nodes of the plurality of computing nodes having the second operational attribute in the original neural network to generate a second offline model;
running, by the operation unit, the original neural network according to the first offline model corresponding to the original neural network and the model structure parameters of the original neural network, wherein the first offline model is run by the application specific neural network processor without compiling the original neural network, wherein the running of the original neural network includes:
acquiring, by the acquisition unit, a third offline model corresponding to a new original neural network from the first nonvolatile memory;
acquiring, by the acquisition unit, order of execution of the respective compute nodes in the new original neural network according to the model structure parameters of the new original neural network;
acquiring, by the acquisition unit, network weights and instructions corresponding to the respective compute nodes in the new original neural network successively from the third offline model according to the order of execution of the respective compute nodes in the new original neural network; and running, by the operation unit, the new original neural network directly according to the network weights and the instructions corresponding to the respective compute nodes in the new original neural network without repeating the compiling of the respective compute nodes.

* * * * *